US012560239B2

(12) United States Patent
Yamaguchi et al.

(10) Patent No.: US 12,560,239 B2
(45) Date of Patent: \*Feb. 24, 2026

(54) SLIDING COMPONENTS

(71) Applicant: EAGLE INDUSTRY CO., LTD.,
Tokyo (JP)

(72) Inventors: Gai Yamaguchi, Tokyo (JP); Ryosuke Uchiyama, Tokyo (JP); Takahiro Tsukamoto, Tokyo (JP); Yuki Maetani, Tokyo (JP); Sayaka Miyazaki, Tokyo (JP); Hiroki Inoue, Tokyo (JP); Minori Onuma, Tokyo (JP); So Makishima, Tokyo (JP); Yuta Negishi, Tokyo (JP)

(73) Assignee: EAGLE INDUSTRY CO., LTD.,
Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/685,139

(22) PCT Filed: Jul. 27, 2022

(86) PCT No.: PCT/JP2022/028961
§ 371 (c)(1),
(2) Date: Feb. 20, 2024

(87) PCT Pub. No.: WO2023/026755
PCT Pub. Date: Mar. 2, 2023

(65) Prior Publication Data
US 2024/0353007 A1 Oct. 24, 2024

(30) Foreign Application Priority Data
Aug. 25, 2021 (JP) ................................. 2021-137307

(51) Int. Cl.
*F16J 15/34* (2006.01)

(52) U.S. Cl.
CPC ..................................... *F16J 15/34* (2013.01)

(58) Field of Classification Search
CPC ...................................................... F16J 15/3424
See application file for complete search history.

(56) References Cited

U.S. PATENT DOCUMENTS

| 1,876,515 A | 9/1932 | Emmet et al. |
| 2,244,450 A | 6/1941 | Erni |

(Continued)

FOREIGN PATENT DOCUMENTS

| CN | 1245552 | 2/2000 | ............... F16J 15/34 |
| CN | 1401924 | 3/2003 | ............... F16J 15/16 |

(Continued)

OTHER PUBLICATIONS

U.S. Appl. No. 18/685,181, filed Feb. 20, 2024, Imura et al.
U.S. Appl. No. 18/685,144, filed Feb. 20, 2024, Tsukamoto et al.

*Primary Examiner* — Vishal A Patel
(74) *Attorney, Agent, or Firm* — HAYES SOLOWAY P.C.

(57) ABSTRACT

A sliding surface of a first sliding component and a sliding surface of a second sliding component slide against each other in an intersecting manner such that first positive pressure generation grooves and second positive pressure generation grooves at least partially overlap each other. The first positive pressure generation grooves include at least one groove that differs in a position of a terminating end portion from other grooves. The one groove includes a terminating end portion located closer to a sealed fluid space side than a terminating end portions of the other grooves and terminating end portions of the second positive pressure generation grooves.

5 Claims, 16 Drawing Sheets

(56) References Cited

U.S. PATENT DOCUMENTS

| | | | | |
|---|---|---|---|---|
| 3,380,040 | A | 4/1968 | Liggett | F16C 17/045 |
| 3,383,116 | A | 5/1968 | Carter | 277/96 |
| 3,527,465 | A | 9/1970 | Guinard | |
| 3,675,935 | A | 7/1972 | Ludwig | F16J 15/342 |
| 3,695,789 | A | 10/1972 | Jansson | F01C 21/003 |
| 3,704,019 | A | 11/1972 | McHugh | 277/400 |
| 3,782,737 | A | 1/1974 | Ludwig et al. | 277/27 |
| 3,855,624 | A | 12/1974 | Reinhoudt | |
| 4,056,478 | A | 11/1977 | Capelli | C01M 5/00 |
| 4,071,253 | A | 1/1978 | Heinen et al. | 277/3 |
| 4,523,764 | A | 6/1985 | Albers et al. | 277/3 |
| 4,889,348 | A | 12/1989 | Amundson | 277/306 |
| 5,071,141 | A | 12/1991 | Lai et al. | |
| 5,092,612 | A | 3/1992 | Victor et al. | 277/96.1 |
| 5,174,584 | A | 12/1992 | Lahrman | 277/400 |
| 5,180,173 | A | 1/1993 | Kimura et al. | |
| 5,201,531 | A | 4/1993 | Lai | |
| 5,224,714 | A | 7/1993 | Kimura | 277/400 |
| 5,316,455 | A | 5/1994 | Yoshimura | F04C 29/0021 |
| 5,447,316 | A | 9/1995 | Matsui | 277/400 |
| 5,556,111 | A | 9/1996 | Sedy | 277/400 |
| 5,558,341 | A | 9/1996 | McNickle | 277/400 |
| 5,769,604 | A | 6/1998 | Gardner et al. | 415/170.1 |
| 5,834,094 | A | 11/1998 | Etsion et al. | 428/156 |
| 5,947,481 | A | 9/1999 | Young | 277/400 |
| 5,952,080 | A | 9/1999 | Etsion et al. | 428/156 |
| 6,002,100 | A | 12/1999 | Etsion | 219/121.71 |
| 6,046,430 | A | 4/2000 | Etsion | 219/121.71 |
| 6,135,458 | A | 10/2000 | Fuse | 277/401 |
| 6,152,452 | A * | 11/2000 | Wang | F16J 15/3412 |
| | | | | 277/400 |
| 6,213,473 | B1 | 4/2001 | Lebeck | |
| 6,446,976 | B1 | 9/2002 | Key et al. | F16J 15/34 |
| 6,692,006 | B2 | 2/2004 | Holder | 277/346 |
| 6,726,213 | B2 | 4/2004 | Wang | 277/400 |
| 7,258,346 | B2 | 8/2007 | Tejima | 277/399 |
| 7,377,518 | B2 | 5/2008 | Lai | 277/400 |
| 7,758,051 | B2 | 7/2010 | Roberts-Haritonov | 277/401 |
| 7,931,277 | B2 | 4/2011 | Garrison | 277/399 |
| 8,100,405 | B2 | 1/2012 | Kneeland et al. | 277/355 |
| 8,342,534 | B2 | 1/2013 | Vasagar | 277/399 |
| 8,585,060 | B2 | 11/2013 | Oshii et al. | 277/401 |
| 9,062,775 | B2 | 6/2015 | Short et al. | |
| 9,151,390 | B2 * | 10/2015 | Hosoe | F16J 15/342 |
| 9,169,931 | B2 | 10/2015 | Tokunaga | F16J 15/34 |
| 9,228,660 | B2 | 1/2016 | Hosoe | F16J 15/3412 |
| 9,353,867 | B2 | 5/2016 | Itadani et al. | F16J 15/3448 |
| 9,494,239 | B2 | 11/2016 | Hosoe | F16J 15/342 |
| 9,512,923 | B2 | 12/2016 | Inoue et al. | F16J 15/34 |
| 9,574,666 | B2 | 2/2017 | Ferris | F16J 15/3412 |
| 9,574,667 | B2 | 2/2017 | Takahashi et al. | F16J 15/342 |
| 9,772,037 | B2 | 9/2017 | Itadani et al. | F16J 15/3412 |
| 9,784,372 | B2 | 10/2017 | Iguchi | F16J 15/342 |
| 9,863,473 | B2 | 1/2018 | Hosoe et al. | F16C 33/741 |
| 9,958,010 | B2 | 5/2018 | Itadani | F16C 33/74 |
| 9,982,715 | B2 | 5/2018 | Gorges et al. | F16C 33/201 |
| 10,054,230 | B2 | 8/2018 | Katori et al. | F16J 15/3412 |
| 10,132,411 | B2 | 11/2018 | Hosoe et al. | F16J 15/164 |
| 10,337,620 | B2 | 7/2019 | Tokunaga et al. | F16J 15/342 |
| 10,443,737 | B2 | 10/2019 | Itadani | F16J 15/342 |
| 10,495,228 | B2 | 12/2019 | Itadani | F16J 15/342 |
| 10,865,883 | B2 | 12/2020 | Seki et al. | F16J 15/3404 |
| 11,053,975 | B2 | 7/2021 | Imura | F16C 17/045 |
| 11,125,335 | B2 | 9/2021 | Kimura et al. | |
| 11,248,706 | B2 | 2/2022 | Imura | F16C 33/74 |
| 11,320,052 | B2 | 5/2022 | Imura et al. | F16J 15/34 |
| 11,913,454 | B2 | 2/2024 | Suzuki | F04C 29/00 |
| 12,000,488 | B2 | 6/2024 | Lang et al. | |
| 2002/0014743 | A1 | 2/2002 | Zheng | F16J 15/34 |
| 2002/0093141 | A1 | 7/2002 | Wang | F16J 15/34 |
| 2002/0158416 | A1 | 10/2002 | Hosanna | F16J 15/3404 |
| 2004/0080112 | A1 | 4/2004 | Tejima | F16J 15/3436 |
| 2005/0135957 | A1 | 6/2005 | Park | F04C 18/0215 |
| 2005/0212217 | A1 | 9/2005 | Tejima | 277/399 |
| 2005/0263963 | A1 | 12/2005 | Lai | 277/399 |
| 2007/0228664 | A1 | 10/2007 | Anand | F16J 15/3496 |
| 2007/0267820 | A1 | 11/2007 | Martin | F16J 15/3496 |
| 2007/0275267 | A1 | 11/2007 | Sabouni | F16J 15/3496 |
| 2007/0296156 | A1 | 12/2007 | Yanagisawa et al. | 277/352 |
| 2008/0050260 | A1 | 2/2008 | Iwanami et al. | 418/55.6 |
| 2008/0100001 | A1 | 5/2008 | Flaherty | |
| 2009/0200749 | A1 | 8/2009 | Teshima | F16J 15/3484 |
| 2011/0194966 | A1 | 8/2011 | Takeuchi | F04B 18/0215 |
| 2011/0215531 | A1 | 9/2011 | Tokunaga et al. | 277/399 |
| 2011/0215535 | A1 | 9/2011 | Vasagar | 277/559 |
| 2011/0305871 | A1 | 12/2011 | Tabuchi | F16J 15/3284 |
| 2012/0018957 | A1 | 1/2012 | Watanabe | F16J 15/34 |
| 2012/0217705 | A1 | 8/2012 | Hosoe | 277/400 |
| 2012/0280458 | A1 | 11/2012 | Artiles et al. | |
| 2013/0168928 | A1 | 7/2013 | Schrufer | C10M 103/02 |
| 2013/0209011 | A1 | 8/2013 | Tokunaga | |
| 2013/0323105 | A1 | 12/2013 | Chao et al. | F04C 29/028 |
| 2014/0159314 | A1 | 6/2014 | Hosoe | F16J 15/34 |
| 2014/0197600 | A1 | 7/2014 | Hosoe | F16J 15/342 |
| 2014/0217676 | A1 | 8/2014 | Hosoe et al. | 277/350 |
| 2014/0319776 | A1 | 10/2014 | Theike et al. | |
| 2015/0115540 | A1 | 4/2015 | Tokunaga | F16J 15/34 |
| 2015/0123350 | A1 | 5/2015 | Itadani | F16J 15/3412 |
| 2015/0167847 | A1 | 6/2015 | Tokunaga | |
| 2015/0184752 | A1 | 7/2015 | Itadani | F16J 15/3412 |
| 2015/0345641 | A1 | 12/2015 | Lattin | |
| 2015/0345642 | A1 | 12/2015 | Haas | F16J 15/3496 |
| 2015/0377297 | A1 | 12/2015 | Tokunaga et al. | F16C 33/748 |
| 2016/0033045 | A1 | 2/2016 | Itadani et al. | F16J 15/3412 |
| 2016/0097457 | A1 | 4/2016 | Sun et al. | F16J 15/3412 |
| 2017/0089467 | A1 | 3/2017 | Young | F01D 11/003 |
| 2017/0146014 | A1 | 5/2017 | Ohta et al. | F04C 29/0021 |
| 2017/0241549 | A1 | 8/2017 | Itadani | F16J 15/3412 |
| 2017/0261107 | A1 | 9/2017 | Martin | F16J 15/3452 |
| 2017/0350407 | A1 | 12/2017 | Yamamoto et al. | F04D 29/046 |
| 2018/0017163 | A1 | 1/2018 | Hosoe et al. | F16J 15/164 |
| 2018/0073394 | A1 | 3/2018 | Tokunaga et al. | F01D 25/18 |
| 2018/0106157 | A1 | 4/2018 | Kovacik et al. | F01D 11/01 |
| 2018/0112711 | A1 | 4/2018 | Itadani | F16J 15/363 |
| 2018/0128377 | A1 | 5/2018 | Tukunaga et al. | F16J 15/342 |
| 2018/0128378 | A1 | 5/2018 | Tokunaga et al. | F16J 15/342 |
| 2018/0135699 | A1 | 5/2018 | Tokunaga et al. | F16C 33/80 |
| 2018/0172162 | A1 | 6/2018 | Tokunaga et al. | F16J 15/34 |
| 2018/0195618 | A1 | 7/2018 | Itadani et al. | F16J 15/3416 |
| 2018/0299015 | A1 | 10/2018 | Itadani | F16J 15/3448 |
| 2019/0169988 | A1 | 6/2019 | Tokunaga et al. | F01C 19/12 |
| 2019/0170257 | A1 | 6/2019 | Hosoe et al. | F16J 15/3412 |
| 2019/0285115 | A1 | 9/2019 | Negishi et al. | F16C 17/045 |
| 2019/0301522 | A1 | 10/2019 | Negishi et al. | F16C 17/02 |
| 2019/0331162 | A1 | 10/2019 | Negishi | F16J 15/34 |
| 2019/0376558 | A1 * | 12/2019 | Kimura | F16C 33/743 |
| 2020/0141444 | A1 | 5/2020 | Thatte | F16C 17/08 |
| 2020/0224722 | A1 | 7/2020 | Imura | F16C 33/743 |
| 2020/0224768 | A1 | 7/2020 | Imura | F16J 15/3412 |
| 2020/0240470 | A1 | 7/2020 | Sorgenti | F16J 15/3212 |
| 2020/0332901 | A1 | 10/2020 | Imura | F16J 15/3412 |
| 2021/0041026 | A1 | 2/2021 | Imura | F16J 15/3424 |
| 2021/0048062 | A1 | 2/2021 | Masumi et al. | F16C 17/102 |
| 2021/0048106 | A1 | 2/2021 | Imura et al. | F16J 15/3412 |
| 2021/0080009 | A1 | 3/2021 | Kimura et al. | F16J 15/3412 |
| 2021/0116030 | A1 | 4/2021 | Kimura et al. | F16J 15/182 |
| 2021/0116032 | A1 | 4/2021 | Kimura | F16J 15/188 |
| 2021/0364034 | A1 | 11/2021 | Okada | F16J 15/342 |
| 2022/0056949 | A1 | 2/2022 | Ikeda et al. | F16C 17/04 |
| 2022/0145931 | A1 | 5/2022 | Imura | |
| 2022/0196152 | A1 | 6/2022 | Imura | |
| 2023/0027772 | A1 | 1/2023 | Suzuki et al. | F16C 17/02 |
| 2023/0258182 | A1 | 8/2023 | Suzuki | F04C 18/0215 |

FOREIGN PATENT DOCUMENTS

| | | | | |
|---|---|---|---|---|
| CN | 101644333 | 2/2010 | | F16J 15/34 |
| CN | 201496542 | 6/2010 | | F16J 15/16 |
| CN | 101793324 | 8/2010 | | F16J 15/16 |
| CN | 203098871 | 7/2013 | | F16J 15/34 |
| CN | 103557229 | 2/2014 | | F16C 17/04 |
| CN | 103557334 | 2/2014 | | F16J 15/34 |
| CN | 203641506 | 6/2014 | | F16J 15/16 |
| CN | 205244387 | 5/2016 | | F16J 15/16 |

(56) References Cited

FOREIGN PATENT DOCUMENTS

| | | | |
|---|---|---|---|
| CN | 205877184 | 1/2017 | F16J 15/16 |
| CN | 205877198 | 1/2017 | F16J 15/34 |
| CN | 106439023 | 2/2017 | F16J 15/16 |
| CN | 107489770 | 12/2017 | F16J 15/34 |
| CN | 109237042 | 1/2019 | F16J 15/34 |
| CN | 110925426 | 3/2020 | F16J 15/16 |
| CN | 111306302 | 6/2020 | F16J 15/3288 |
| DE | 102008038396 | 2/2010 | |
| EP | 0369295 | 11/1988 | F16J 15/34 |
| EP | 0518681 | 12/1992 | G11B 15/60 |
| EP | 0637706 | 8/1993 | F16J 15/34 |
| EP | 2138225 | 12/2009 | B01J 13/20 |
| EP | 2754931 | 7/2014 | F16J 15/34 |
| EP | 3112078 | 1/2017 | B23K 26/364 |
| EP | 3196516 | 7/2017 | F16J 15/34 |
| EP | 3217049 | 9/2017 | F16J 15/34 |
| EP | 3396186 | 10/2018 | F16C 33/10 |
| EP | 3575621 | 12/2019 | F16C 33/10 |
| EP | 3575643 | 12/2019 | F16J 15/34 |
| EP | 3650722 | 5/2020 | F16C 33/12 |
| FI | 1509482 | 5/1978 | F16C 33/10 |
| FR | 2342440 | 9/1997 | F16J 15/34 |
| GB | 2263952 | 8/1993 | F16J 15/34 |
| JP | S51-034974 | 3/1976 | |
| JP | S52-143571 | 10/1977 | F16J 15/26 |
| JP | 57163770 | 10/1982 | F16J 15/3412 |
| JP | H05-99344 | 4/1983 | F16J 15/34 |
| JP | S59-195253 | 12/1984 | F16J 15/34 |
| JP | S59-195254 | 12/1984 | F16J 15/34 |
| JP | S59-231269 | 12/1984 | F16J 15/34 |
| JP | S59231268 | 12/1984 | |
| JP | S61-8402 | 1/1986 | F01C 1/01 |
| JP | S61-82177 | 5/1986 | F16J 15/34 |
| JP | S62-31775 | 2/1987 | F16J 15/34 |
| JP | S63-134883 | 6/1988 | F04C 18/02 |
| JP | H02-16381 | 1/1990 | F04C 18/02 |
| JP | H02-236067 | 9/1990 | F16J 15/34 |
| JP | H02-136863 | 11/1990 | F16J 15/34 |
| JP | H04-50559 | 2/1992 | F16J 15/34 |
| JP | H04-337165 | 11/1992 | F16J 15/34 |
| JP | H04-362289 | 12/1992 | F04C 18/02 |
| JP | H05-60247 | 3/1993 | F16J 15/34 |
| JP | H05-296248 | 11/1993 | |
| JP | H06-117547 | 4/1994 | F16J 15/34 |
| JP | H06-174107 | 6/1994 | F16J 15/34 |
| JP | H06-105105 | 12/1994 | F16J 15/34 |
| JP | H07-43038 | 5/1995 | F16J 15/34 |
| JP | 9-89119 | 3/1997 | F16J 15/34 |
| JP | H09228968 | 9/1997 | F01C 17/06 |
| JP | 9-292034 | 11/1997 | F16J 15/34 |
| JP | H10-281299 | 10/1998 | F16J 15/34 |
| JP | H10-292867 | 11/1998 | |
| JP | H10-339286 | 12/1998 | F04C 18/02 |
| JP | H11-132163 | 5/1999 | F04C 18/02 |
| JP | H11-287329 | 10/1999 | F16J 15/34 |
| JP | H11-303858 | 11/1999 | F16C 17/10 |
| JP | 3066367 | 5/2000 | F16J 15/34 |
| JP | 2001-12458 | 1/2001 | F16C 17/10 |
| JP | 2003-343730 | 12/2003 | F16J 15/22 |
| JP | 2004-360903 | 12/2004 | F16J 15/447 |
| JP | 2005-155894 | 6/2005 | F16C 17/04 |
| JP | 2005-180652 | 7/2005 | F16J 15/34 |
| JP | 2005-315391 | 11/2005 | |
| JP | 2006-9614 | 1/2006 | F04C 18/08 |
| JP | 2006-77899 | 3/2006 | F16J 15/34 |
| JP | 2006-90524 | 4/2006 | F16C 17/02 |
| JP | 2006-183702 | 7/2006 | F16C 17/04 |
| JP | 2006-316677 | 11/2006 | F04C 18/02 |
| JP | 2007-162045 | 6/2007 | |
| JP | 2007-263374 | 10/2007 | F16J 15/34 |
| JP | 2011-74931 | 4/2011 | F16J 15/34 |
| JP | 2012-2295 | 1/2012 | F16J 15/34 |
| JP | 2012-062534 | 3/2012 | |
| JP | 2012-82794 | 4/2012 | F04C 18/02 |
| JP | 2012-122135 | 6/2012 | C25D 15/02 |
| JP | 2013-167216 | 8/2013 | F04C 18/02 |
| JP | 2013-213545 | 10/2013 | F16C 32/06 |
| JP | 2014-529052 | 10/2014 | |
| JP | 2015-063647 | 4/2015 | |
| JP | 2015-68330 | 4/2015 | F04C 29/00 |
| JP | 5693599 | 4/2015 | |
| JP | 2015-183631 | 10/2015 | F04C 2/10 |
| JP | 2016-80090 | 5/2016 | F16J 15/34 |
| WO | WO2013053411 | 4/2013 | |
| WO | WO2014061544 | 4/2014 | |
| WO | WO2018139231 | 8/2018 | F16J 15/34 |
| WO | WO2018139232 | 8/2018 | F16C 33/10 |
| WO | WO2020032086 | 2/2020 | F16J 15/34 |

* cited by examiner

ROTATION DIRECTION
OF ROTATING SEAL RING

ROTATION DIRECTION
OF ROTATING SEAL RING

SLIDING COMPONENTS

TECHNICAL FIELD

The present invention relates to sliding components that rotate relative to each other, for example, a pair of sliding components used for a shaft sealing device that seals a rotating shaft of a rotating machine in an automotive seal field, a general industrial machine seal field, or other seal fields, or a pair of sliding components used for a bearing of a machine in an automotive bearing field, a general industrial machine bearing field, or other bearing fields.

BACKGROUND ART

As a shaft sealing device that prevents a leakage of a sealed fluid, for example, there is a mechanical seal including a pair of sliding components having an annular shape which rotate relative to each other and of which sliding surfaces slide against each other. In such a mechanical seal, in recent years, there has been a demand for reducing sliding-induced energy loss for environmental measures and the like.

For example, a mechanical seal illustrated in Patent Citation 1 is configured such that a pair of sliding components having an annular shape are rotatable relative to each other, a sealed fluid exists in an outer space, and a low-pressure fluid exists in an inner space. One sliding component is provided with a plurality of spiral grooves which communicate with the inner space, which extend in an arcuate shape from a radially inner end of the one sliding component to a radially outer side in a circumferential direction while being inclined, and of which terminating ends are closed on a downstream side in a relative rotation direction. According this configuration, during relative rotation of the pair of sliding components, since the low-pressure fluid is introduced from the inner space into the spiral grooves of the one sliding component, a positive pressure is generated at the terminating ends and in the vicinities of the terminating ends to slightly separate sliding surfaces of the pair of sliding components from each other, so that low friction is realized.

CITATION LIST

Patent Literature

Patent Citation 1: JP S62-31775 A (Pages 2 and 3, FIG. 2)

SUMMARY OF INVENTION

Technical Problem

However, in the sliding components as in Patent Citation 1, since the configuration is such that the spiral grooves are provided in the one sliding component and extend from the radially inner end to the radially outer side and the low-pressure fluid in the inner space is introduced thereinto, low friction can be realized. However, until the sliding components reach the state of certain level or higher high-speed rotation, a sufficient dynamic pressure is not generated in the spiral grooves, and it takes time to separate the sliding surfaces from each other, so that there is a risk that the sliding surfaces are subjected to wear.

The present invention has been made in view of such problems, and an object of the present invention is to provide a pair of sliding components capable of suppressing wear between sliding surfaces from the start of relative rotation to high-speed rotation, and suppressing a leakage of a sealed fluid.

Solution to Problem

In order to solve the foregoing problems, according to the present invention, there are provided sliding components which are a first sliding component and a second sliding component disposed at a relative rotational location of a rotating machine, and of which sliding surfaces slide relative to each other, wherein the sliding surface of the first sliding component is provided with a plurality of first positive pressure generation grooves communicating with a space on a leakage side, extending in a relative rotation direction of the second sliding component, and including terminating end portions, the sliding surface of the second sliding component is provided with a plurality of second positive pressure generation grooves communicating with the space on the leakage side, extending in a relative rotation direction of the first sliding component, and including terminating end portions, the sliding surface of the first sliding component and the sliding surface of the second sliding component slide against each other in an intersecting manner such that the first positive pressure generation grooves and the second positive pressure generation grooves at least partially overlap each other, at least one groove of the first positive pressure generation grooves differs in a radial position of the terminating end portion from other grooves of the first positive pressure generation grooves, and the terminating end portion of the one groove is located closer to a sealed fluid space side than the terminating end portions of the other grooves and the terminating end portions of the second positive pressure generation grooves.

According to the aforesaid feature of the present invention, since the first positive pressure generation groove and the second positive pressure generation groove communicate with each other at an intersection portion, during low-speed relative rotation, in addition to portions of the first positive pressure generation groove and the second positive pressure generation groove communicating with the space on the leakage side, the fluid can also be taken in from the facing first positive pressure generation groove or the facing second positive pressure generation groove, and a force that separates the sliding surfaces from each other can be immediately generated. In addition, the one groove can discharge contamination, which has flowed into the sealed fluid space side from the terminating end portion of the first positive pressure generation groove and the terminating end portion of the second positive pressure generation groove, from the terminating end portion of the one groove toward a sealed fluid space between the sliding surfaces.

It may be preferable that the terminating end portions of the other grooves are located closer to the sealed fluid space side than the terminating end portions of the second positive pressure generation grooves. According to this preferable configuration, a positive pressure generated at the terminating end portions of the other grooves and a positive pressure generated at the terminating end portions of the second positive pressure generation grooves do not interfere with each other.

It may be preferable that the one groove is provided in a rotating seal ring that is one of the pair of sliding components. According to this preferable configuration, a positive pressure is likely to be generated in the one groove using a rotational force of the rotating seal ring. In addition, contamination is easily discharged.

It may be preferable that a volume of each of the other grooves is larger than a volume of each of the second positive pressure generation grooves, and a volume of the one groove is larger than the volume of each of the other grooves. According to this preferable configuration, during low-speed relative rotation of the sliding components, a first force caused by the positive pressure generated by the fluid inside the second positive pressure generation groove mainly acts to separate the sliding surfaces from each other, a second force caused by the positive pressure generated by the fluid inside the other grooves increases as the relative rotation speed of the sliding components increases, and when the relative rotation speed of the sliding components becomes sufficiently high, the second force becomes larger than the first force, so that the second force mainly acts to separate the sliding surfaces from each other. Therefore, wear between the sliding surfaces from low-speed relative rotation to high speed of the pair of sliding components can be suppressed. In addition, during high-speed relative rotation of the sliding components, since the gap formed between the sliding surfaces increases, a positive pressure is less likely to be generated in the second positive pressure generation groove, so that the second force caused by the positive pressure generated in the other grooves can mainly act to stably separate the sliding surfaces from each other. Therefore, the sliding surfaces are separated from each other from the start of relative rotation to high-speed rotation of the pair of sliding components, so that wear therebetween can be suppressed.

It may be preferable that the first positive pressure generation grooves include at least two grooves each of which is the one groove and which are evenly arranged in a circumferential direction. According to this preferable configuration, since a positive pressure in the grooves evenly arranged in a circumferential direction is generated in a well-balanced manner in the circumferential direction of the sliding surfaces, the separation of the sliding surfaces is not affected.

DESCRIPTION OF EMBODIMENTS

Figure 1:
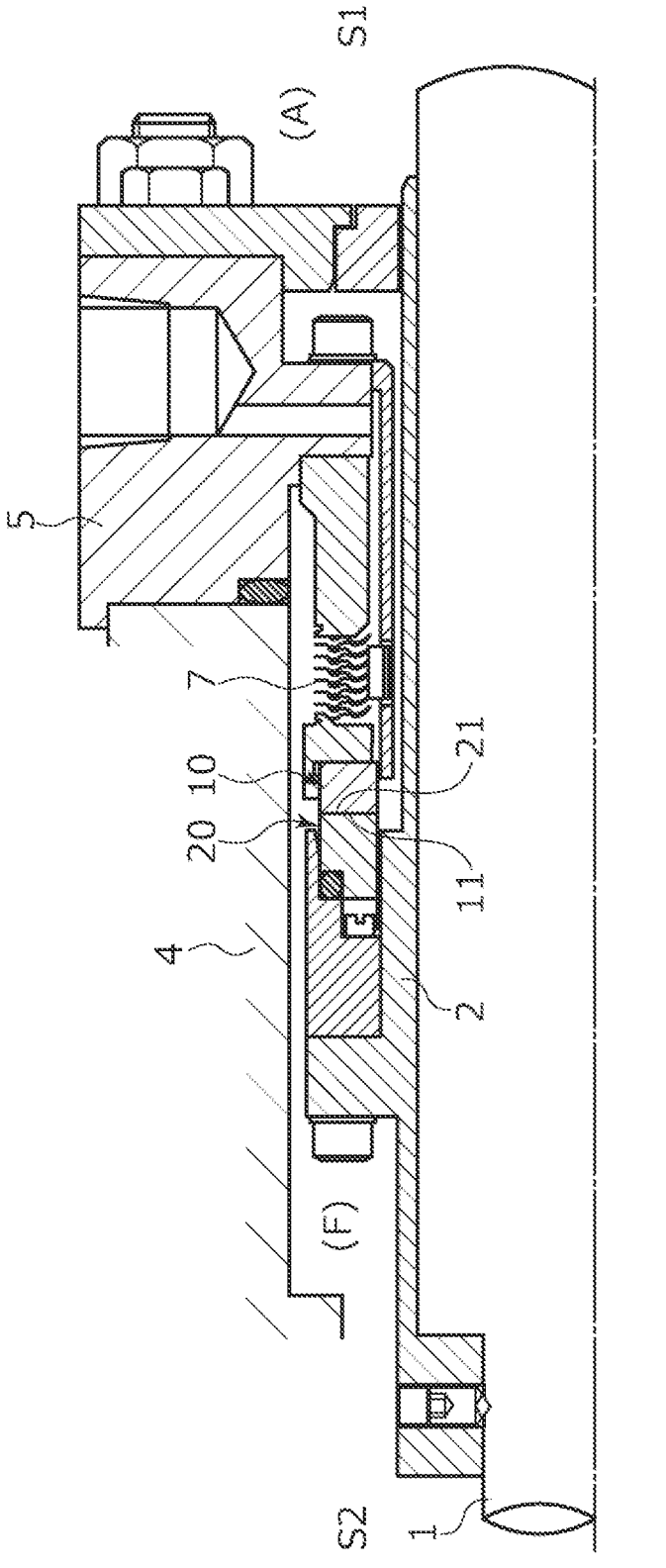
FIG. 1 is a longitudinal sectional view illustrating a mechanical seal as sliding components according to a first embodiment of the present invention.
Figure 2:
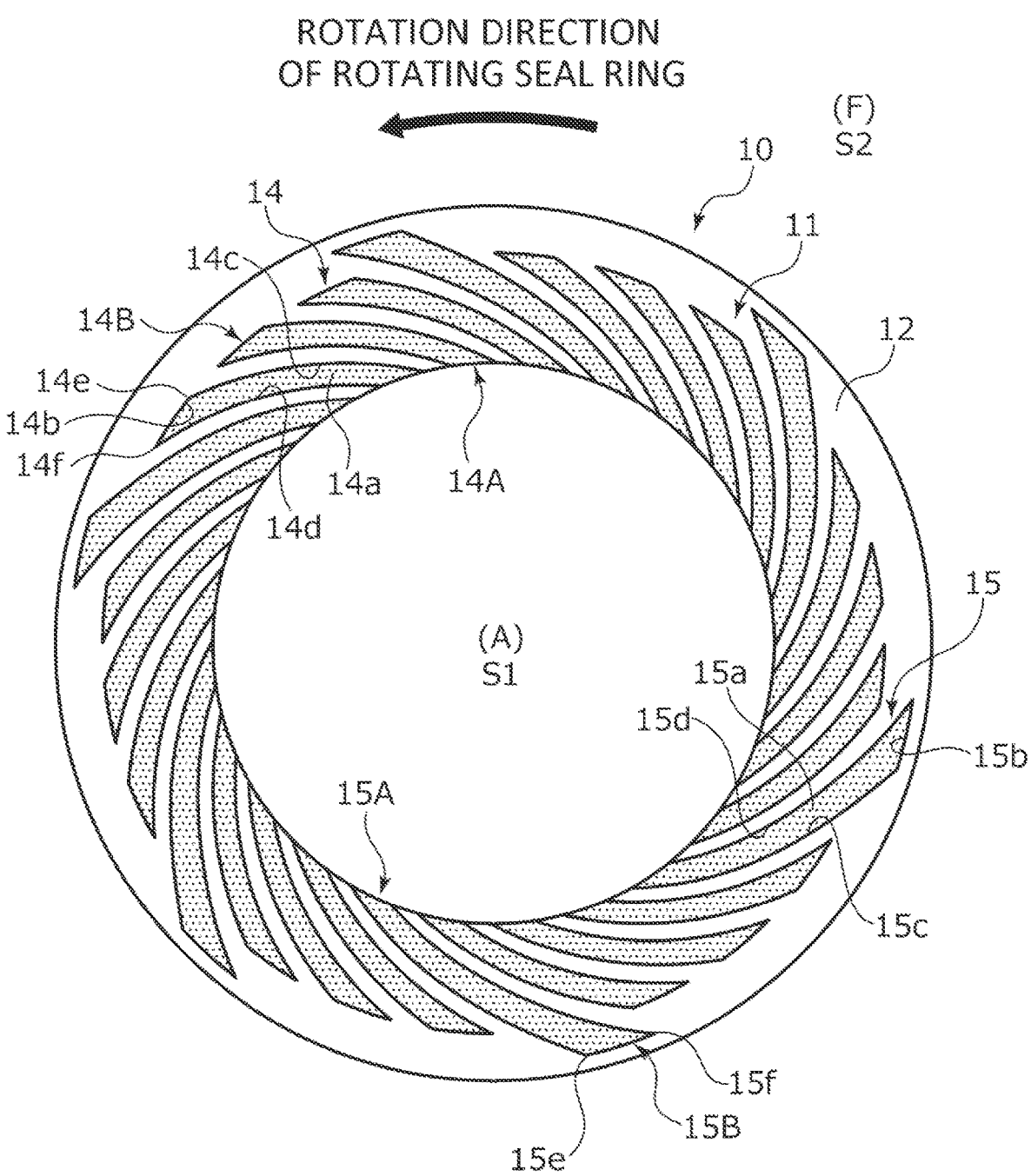
FIG. 2 is a view of a sliding surface of a stationary seal ring in the first embodiment when viewed in an axial direction.

Modes for implementing a pair of sliding components according to the present invention will be described below based on embodiments.

First Embodiment

A pair of sliding components according to a first embodiment of the present invention will be described with reference to FIGS. 1 to 8. Incidentally, in the present embodiment, a mode in which the sliding components form a mechanical seal will be described as an example. In addition, a description will be made based on the fact that a sealed fluid exists in an outer space of the mechanical seal, atmosphere exists in an inner space, a radially outer side of the sliding components forming the mechanical seal is a sealed fluid side (high-pressure side), and a radially inner side is a leakage side (low-pressure side). In addition, for convenience of description, in the drawings, dots may be added to grooves and the like formed in a sliding surface.

A mechanical seal for a general industrial machine illustrated in FIG. 1 is an inside mechanical seal that seals a sealed fluid F tending to leak from the radially outer side toward the radially inner side of sliding surfaces, and that allows an inner space S1 as a space on the leakage side to communicate with atmosphere A. Incidentally, in the present embodiment, a mode in which the sealed fluid F is a high-pressure liquid and the atmosphere A is a gas having lower pressure than the sealed fluid F will be provided as an example.

The mechanical seal mainly includes a rotating seal ring 20 having an annular shape and serving as a second sliding component, and a stationary seal ring 10 having annular shape and serving as a first sliding component. The rotating seal ring 20 is attached to a sleeve 2 fixed to a rotating shaft 1, and is rotatable together with the rotating shaft 1. The stationary seal ring 10 is fixed to a seal cover 5 fixed to a housing 4 of an attached device, so as to be non-rotatable and movable in an axial direction.

The stationary seal ring 10 is biased in the axial direction by a bellows 7. Accordingly, a sliding surface 11 of the stationary seal ring 10 and a sliding surface 21 of the rotating seal ring 20 come into close contact with and slide against each other.

The stationary seal ring 10 and the rotating seal ring 20 are typically made of SiC (as an example of hard material) or a combination of SiC and carbon (as an example of soft material), but are not limited thereto, and any sliding material can be applied as long as the sliding material can be used as a sliding material for a mechanical seal. Incidentally, examples of SiC include sintered bodies using boron, aluminum, carbon, or the like as a sintering aid, and materials consisting of two or more phases with different components and compositions, such as SiC in which graphite particles are dispersed, reaction-sintered SiC consisting of SiC and Si, SiC—TiC, and SiC—TiN, and as carbon, mixed carbon of a carbonaceous substance and a graphitic substance, resin-molded carbon, sintered carbon, and the like can be used. In addition, in addition to the above-described sliding materials, metal materials, resin materials, surface modification materials (e.g., coating materials), composite materials, and the like can also be applied.

A plurality of first positive pressure generation grooves 14 as the other grooves and a plurality of first positive pressure generation grooves 15 as one grooves are provided on the sliding surface 11 of the stationary seal ring 10. The first positive pressure generation grooves 14 and the first positive pressure generation grooves 15 have different lengths.

The first positive pressure generation grooves 14 communicate with the inner space S1 at radially inner-side end portions, namely, relative rotation starting ends 14A, and extend in an arcuate shape from the starting ends 14A toward the radially outer side while being inclined downstream in a rotation direction of the rotating seal ring 20. Radially outer-side end portions of the first positive pressure generation grooves 14, namely, relative rotation terminating ends 14B as terminating end portions are closed not to communicate with the outer space S2 as a sealed fluid space. The first positive pressure generation grooves 14 have an arcuate shape protruding toward the radially outer side.

In detail, each of the first positive pressure generation grooves 14 includes a bottom surface 14a, a wall portion 14b, and side wall portions 14c and 14d. The bottom surface 14a is flat from the starting end 14A to the terminating end 14B, and extends parallel to a flat surface of a land 12. The wall portion 14b extends vertically from an end edge of the terminating end 14B of the bottom surface 14a toward the flat surface of the land 12. The side wall portions 14c and 14d extend vertically from both side edges of the bottom surface 14a toward the flat surface of the land 12. Incidentally, an angle formed by the wall portion 14b and the side wall portion 14c is an obtuse angle, and an angle formed by the wall portion 14b and the side wall portion 14d is an acute angle. An acute angle portion 14f on a side wall portion 14d side of the wall portion 14b is located downstream of an obtuse angle portion 14e on a side wall portion 14c side of the wall portion 14b in the rotation direction of the rotating seal ring 20.

The first positive pressure generation grooves 15 communicate with the inner space S1 at radially inner-side end portions, namely, relative rotation starting ends 15A, and extend in an arcuate shape from the starting ends 15A toward the radially outer side while being inclined downstream in the rotation direction of the rotating seal ring 20. Radially outer-side end portions of the first positive pressure generation grooves 15, namely, relative rotation terminating ends 15B as terminating end portions are closed not to communicate with the outer space S2. The first positive pressure generation grooves 15 have an arcuate shape protruding toward the radially outer side. In addition, as will be described later in detail, the first positive pressure generation grooves 15 extend over a longer distance than the first positive pressure generation grooves 14.

In detail, each of the first positive pressure generation grooves 15 includes a bottom surface 15a, a wall portion 15b, and side wall portions 15c and 15d. The bottom surface 15a is flat from the starting end 15A to the terminating end 15B, and extends parallel to the flat surface of the land 12. The wall portion 15b extends vertically from an end edge of the terminating end 15B of the bottom surface 15a toward the flat surface of the land 12. The side wall portions 15c and 15d extend vertically from both side edges of the bottom surface 15a toward the flat surface of the land 12. Incidentally, an angle formed by the wall portion 15b and the side wall portion 15c is an obtuse angle, and an angle formed by the wall portion 15b and the side wall portion 15d is an acute angle. An acute angle portion 15f on a side wall portion 15d side of the wall portion 15b is located downstream of an obtuse angle portion 15e on a side wall portion 15c side of the wall portion 15b in the rotation direction of the rotating seal ring 20.

The first positive pressure generation grooves 15 are evenly arranged in a circumferential direction of the sliding surface 11. In addition, a plurality (three in the first embodiment) of the first positive pressure generation grooves 14 are arranged at equal intervals between the first positive pressure generation grooves 15 adjacent to each other in the circumferential direction. The first positive pressure generation grooves 14 and the first positive pressure generation grooves 15 extend parallel to each other.

A plurality of the first positive pressure generation grooves 14 and the first positive pressure generation grooves 15 are disposed to overlap each other in a radial direction when viewed in the axial direction. In other words, two first positive pressure generation grooves 14 and one first positive pressure generation groove 15 are disposed on a radius line.

Figure 3:
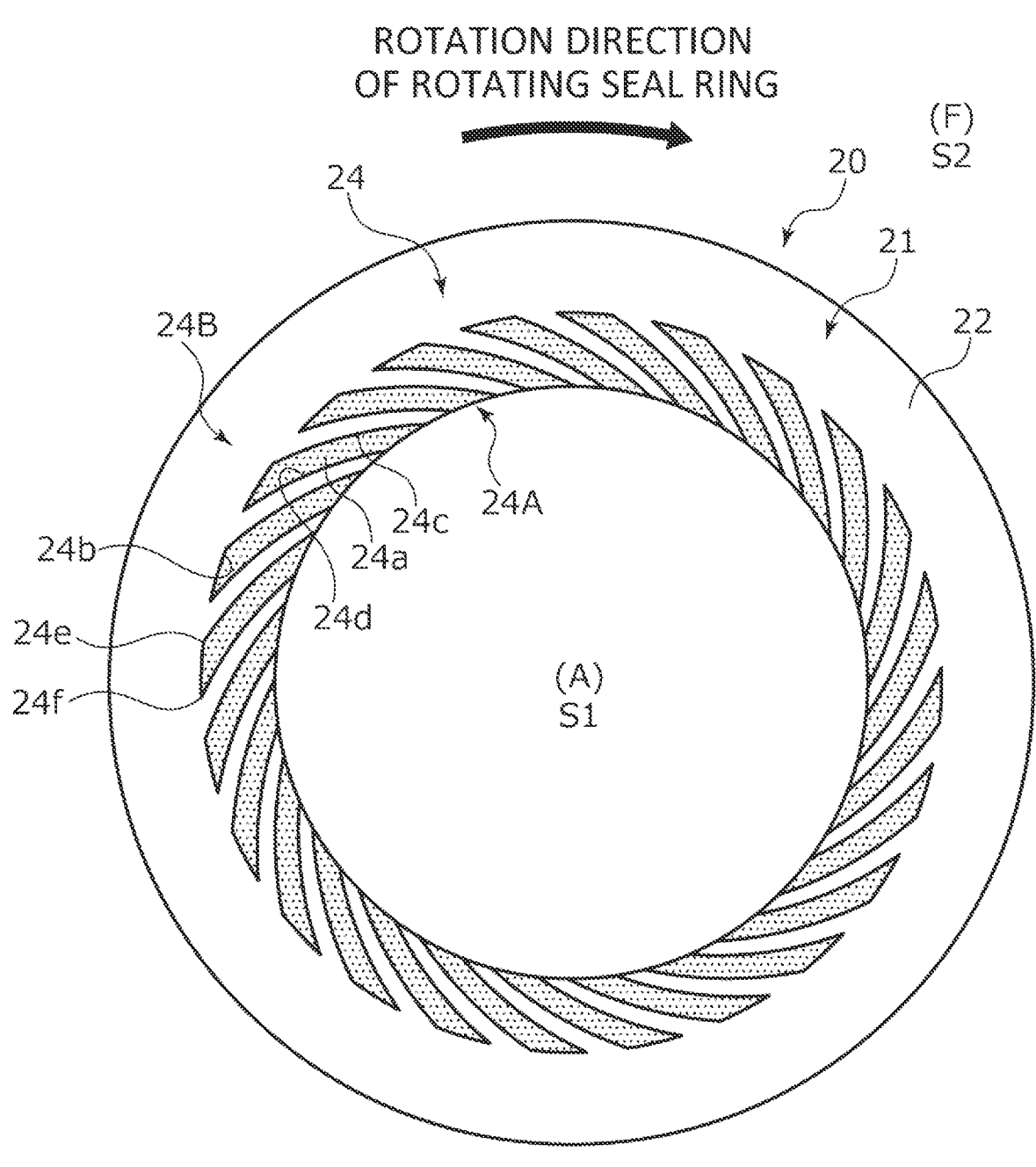
FIG. 3 is a view of a sliding surface of a rotating seal ring in the first embodiment when viewed in the axial direction.

As illustrated in FIG. 3, a plurality (24 in the first embodiment) of second positive pressure generation grooves 24 are evenly arranged in the circumferential direction on the radially inner side of the sliding surface 21 of the rotating seal ring 20. Incidentally, a portion of the sliding surface 21 other than the second positive pressure generation grooves 24 is a land 22 forming a flat surface. Furthermore, the rotating seal ring 20 rotates clockwise as indicated by an arrow when viewed in the axial direction from the sliding surface 21.

The second positive pressure generation grooves 24 communicate with the inner space S1 at radially inner-side end portions, namely, relative rotation starting ends 24A, extend in an arcuate shape from the starting ends 24A toward the radially outer side while being inclined upstream in the rotation direction of the rotating seal ring 20, and are closed at radially outer-side end portions, namely, relative rotation terminating ends 24B as terminating end portions so as not to communicate with the outer space S2. The second positive pressure generation grooves 24 have an arcuate shape protruding toward the radially outer side.

In detail, each of the second positive pressure generation grooves 24 includes a bottom surface 24a that is flat from the starting end 24A to the terminating end 24B and that is parallel to the flat surface of the land 22; a wall portion 24b extending vertically from an end edge of the terminating end 24B of the bottom surface 24a toward the flat surface of the land 22; and side wall portions 24c and 24d extending vertically from both side edges of the bottom surface 24a toward the flat surface of the land 22. Incidentally, an angle formed by the wall portion 24b and the side wall portion 24c is an obtuse angle, an angle formed by the wall portion 24b and the side wall portion 24d is an acute angle, and an acute angle portion 24f on a side wall portion 24d side of the wall portion 24b is located downstream of an obtuse angle portion 24e on a side wall portion 24c side of the wall portion 24b in the rotation direction of the rotating seal ring 20.

A plurality (three in the first embodiment) of the second positive pressure generation grooves 24 are disposed to overlap each other in the radial direction when viewed in the axial direction. In other words, a plurality (three in the first embodiment) of the second positive pressure generation grooves 24 are disposed on a radius line.

Figure 4:
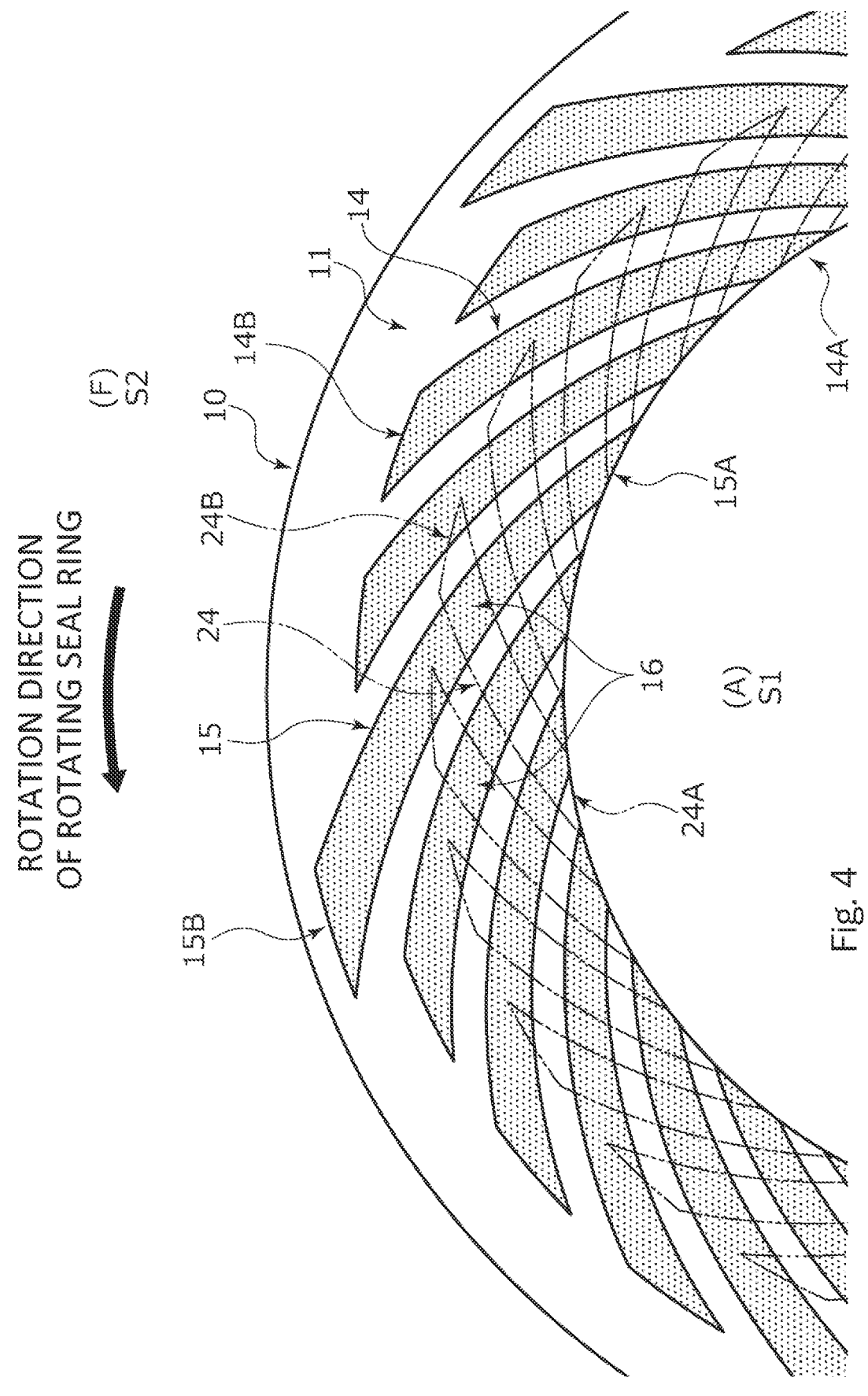
FIG. 4 is a schematic view explaining a state where the sliding surface of the stationary seal ring and the sliding surface of the rotating seal ring are disposed to face each other in the first embodiment, where second positive pressure generation grooves of the rotating seal ring are indicated by two-dotted chain lines.

As illustrated in FIG. 4, in a state where the sliding surface 11 of the stationary seal ring 10 and the sliding surface 21 of the rotating seal ring 20 face each other, the second positive pressure generation grooves 24 and both the first positive pressure generation grooves 14 and the first positive pressure generation grooves 15 are disposed to intersect each other when viewed in the axial direction. Incidentally, in FIG. 4, the sliding surface 11 of the stationary seal ring 10 viewed in the axial direction is illustrated, the first positive pressure generation grooves 14 and the first positive pressure generation grooves 15 are indicated by solid lines, and the second positive pressure generation grooves 24 are indicated by two-dotted chain lines.

Specifically, a plurality of the first positive pressure generation grooves 14 and the first positive pressure generation grooves 15 are disposed to intersect and face one second positive pressure generation groove 24. Namely, a plurality of intersection portions 16 between the second positive pressure generation grooves 24 and both the first positive pressure generation grooves 14 and the first positive pressure generation grooves 15 are formed between the sliding surface 11 and the sliding surface 21.

Figure 5A:
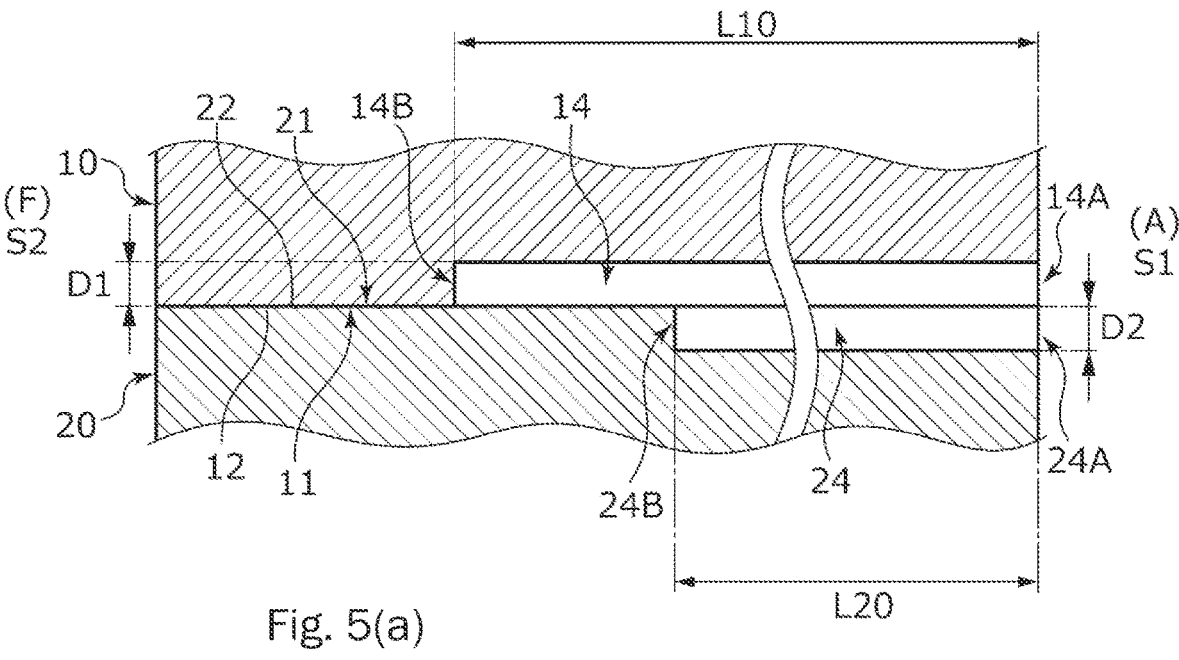
FIG. 5A is a cross-sectional view schematically illustrating the other groove of first positive pressure generation grooves and the second positive pressure generation groove in the first embodiment.

In addition, as illustrated in FIGS. 4 and 5A, an extension distance L10 of the first positive pressure generation groove 14 is longer than an extension distance L20 of the second positive pressure generation groove 24 (L10>L20).

Incidentally, FIG. 5 is a schematic cross-sectional view in which cross sections of one first positive pressure generation groove 14, one first positive pressure generation groove 15, and one second positive pressure generation groove 24 which are cut in a longitudinal direction are arranged at the same position in the axial direction for convenience of description.

In addition, the first positive pressure generation groove 14 has a constant depth D1 along an extension direction. In addition, the second positive pressure generation groove 24 has a constant depth D2 along an extension direction. The depth D1 of the first positive pressure generation groove 14 is the same as the depth D2 of the second positive pressure generation groove 24 (D1=D2).

Figure 5B:
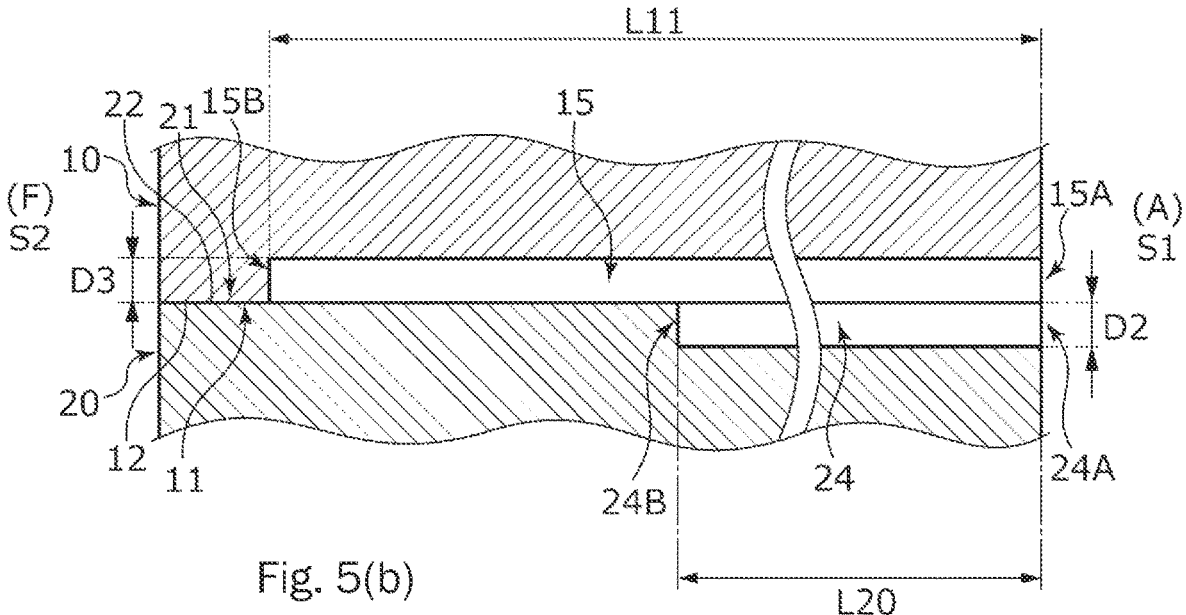
FIG. 5B is a cross-sectional view schematically illustrating one groove of the first positive pressure generation grooves and the second positive pressure generation groove in the first embodiment.

In addition, as illustrated in FIGS. 4 and 5B, an extension distance L11 of the first positive pressure generation groove 15 is longer than the extension distance L10 of the first positive pressure generation groove 14 and the extension distance L20 of the second positive pressure generation groove 24 (L11>L10>L20).

Specifically, the extension distance L10 of the first positive pressure generation groove 14 and the extension distance L20 of the second positive pressure generation groove 24 are approximately ¾ of the extension distance L11 of the first positive pressure generation groove 15.

The terminating end 15B of the first positive pressure generation groove 15 is disposed closer to the radially outer side than the terminating end 14B of the first positive pressure generation groove 14 and the terminating end 24B of the second positive pressure generation groove 24.

In addition, the first positive pressure generation groove 15 has a constant depth D3 along an extension direction. The depth D3 of the first positive pressure generation groove 15 is the same dimension as the depth D1 of the first positive pressure generation groove 14 (D1=D3). In other words, the depth D3 of the first positive pressure generation groove 15 is the same as the depth D2 of the second positive pressure generation groove 24 (D3=D2).

In addition, the first positive pressure generation groove 14, the first positive pressure generation groove 15, and the second positive pressure generation groove 24 have substantially the same width dimension. In addition, since the extension distance L11 of the first positive pressure generation groove 15 is longer than the extension distance L10 of the first positive pressure generation groove 14 and the extension distance L20 of the second positive pressure generation groove 24, an area of the first positive pressure generation groove 15 when viewed in the axial direction is larger than an area of the first positive pressure generation groove 14 and an area of the second positive pressure generation groove 24. Incidentally, the area of the first positive pressure generation groove 14 when viewed in the axial direction is larger than the area of the second positive pressure generation groove 24.

Each volume of the first positive pressure generation groove 14, the first positive pressure generation groove 15, and the second positive pressure generation groove 24 is obtained by multiplying each area of the first positive pressure generation groove 14, the first positive pressure generation groove 15, and the second positive pressure generation groove 24 when viewed in the axial direction by the depths D1, D2, and D3. As described above, the area of the first positive pressure generation groove 15 when viewed in the axial direction is larger than the area of the first positive pressure generation groove 14, and the area of the first positive pressure generation groove 14 is larger than the area of the second positive pressure generation groove 24. In addition, the depths D1, D2, and D3 are the same dimension. Namely, the volume of the first positive pressure generation groove 15 is larger than the volume of the first positive pressure generation groove 14, and the volume of the first positive pressure generation groove 14 is larger than the volume of the second positive pressure generation groove 24.

Next, the flow of the atmosphere A during relative rotation of the stationary seal ring 10 and the rotating seal ring 20 will be schematically described with reference to FIG. 6. Incidentally, the flow of the atmosphere A in FIG. 6 is schematically illustrated without specifying a relative rotation speed of the rotating seal ring 20.

Figure 6A:
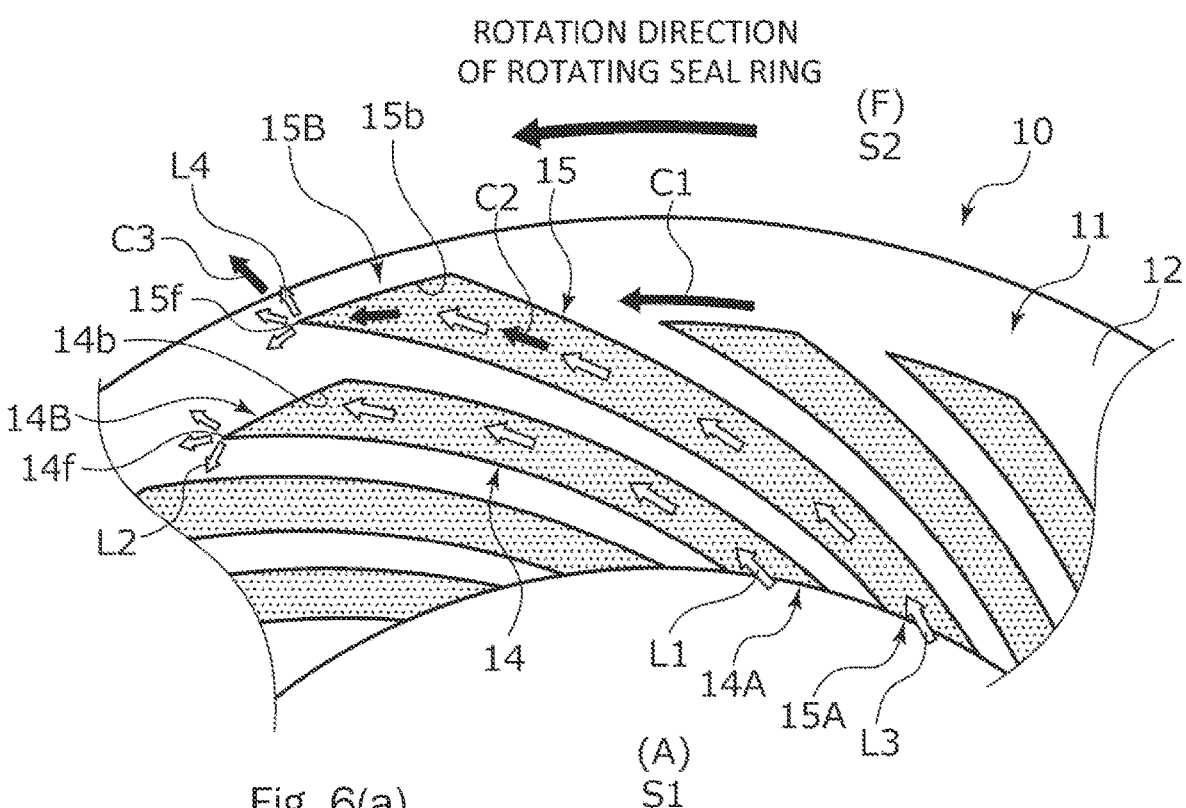
FIG. 6A is an explanatory view illustrating the movement of a fluid of the one groove and the other grooves of the first positive pressure generation grooves when viewed in the axial direction in the first embodiment.

First, the flow of the atmosphere A inside the first positive pressure generation groove 14 will be described. As illustrated in FIG. 6A, when the rotating seal ring 20 rotates relative to the stationary seal ring 10, the atmosphere A inside the first positive pressure generation groove 14 moves from the starting end 14A toward the terminating end 14B as indicated by a white arrow L1.

The atmosphere A that has moved toward the terminating end 14B is increased in pressure at the acute angle portion 14f of the wall portion 14b of the first positive pressure generation groove 14 and in the vicinity of the acute angle portion 14f, and flows into a gap between the sliding surfaces 11 and 21 as indicated by a white arrow L2. Namely, a positive pressure is generated at the acute angle portion 14f and in the vicinity thereof.

Since the atmosphere A inside the first positive pressure generation groove 14 indicated by the white arrow L2 acts to push the sealed fluid F in the vicinity of the terminating end 14B of the first positive pressure generation groove 14 back to an outer space S2 side, the sealed fluid F does not leak to the inner space S1.

Next, the flow of the atmosphere A inside the first positive pressure generation groove 15 will be described. When the rotating seal ring 20 rotates relative to the stationary seal ring 10, the atmosphere A inside the first positive pressure generation groove 15 moves from the starting end 15A toward the terminating end 15B as indicated by a white arrow L3.

The atmosphere A that has moved toward the terminating end 15B is increased in pressure at the acute angle portion 15f of the wall portion 15b of the first positive pressure generation groove 15 and in the vicinity of the acute angle portion 15f, and flows into the gap between the sliding surfaces 11 and 21 as indicated by a white arrow L4. Namely, a positive pressure is generated at the acute angle portion 15f and in the vicinity thereof.

Since the atmosphere A inside the first positive pressure generation groove 15 indicated by the white arrow L4 acts to push the sealed fluid F in the vicinity of the terminating end 15B of the first positive pressure generation groove 15 back to the outer space S2 side, the sealed fluid F does not leak to the inner space S1.

Figure 6B:
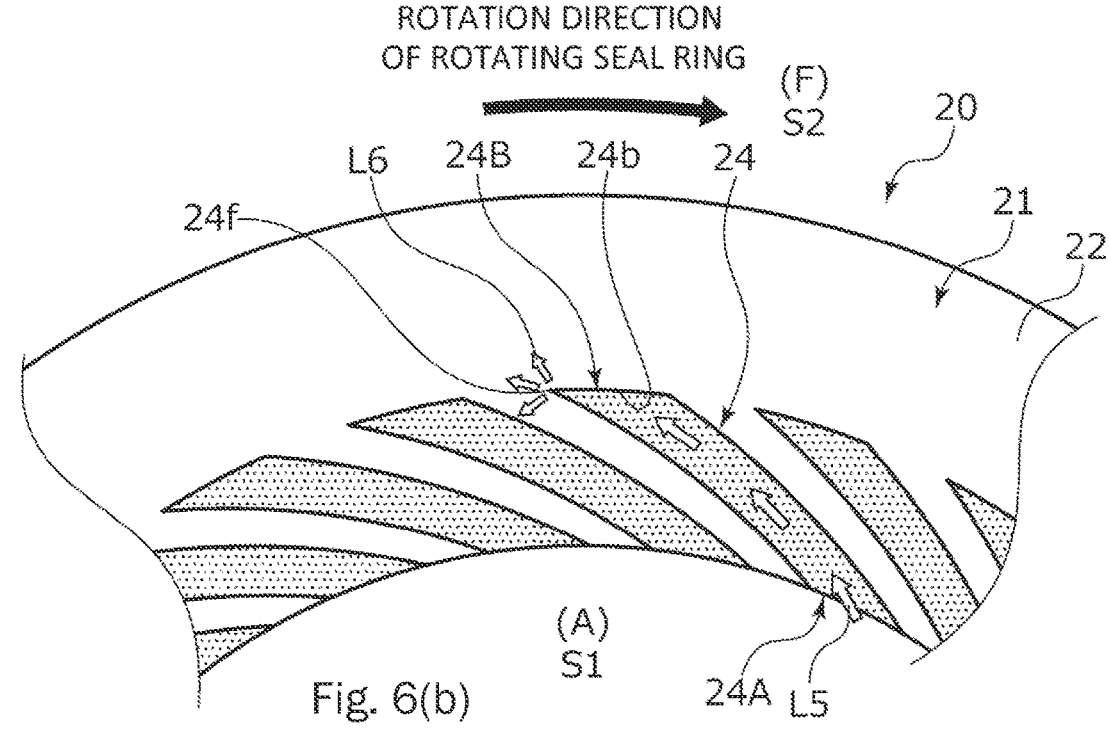
FIG. 6B is an explanatory view illustrating the movement of the fluid of the second positive pressure generation groove when viewed in the axial direction in the first embodiment.

Next, the flow of the atmosphere A inside the second positive pressure generation groove 24 will be described. As illustrated in FIG. 6B, when the rotating seal ring 20 rotates relative to the stationary seal ring 10, the atmosphere A inside the second positive pressure generation groove 24 moves from the starting end 24A toward the terminating end 24B as indicated by a white arrow L5.

The atmosphere A that has moved toward the terminating end 24B is increased in pressure at the acute angle portion 24f of the wall portion 24b of the second positive pressure generation groove 24 and in the vicinity of the acute angle portion 24f, and flows into the gap between the sliding surfaces 11 and 21 as indicated by a white arrow L6. Namely, a positive pressure is generated at the acute angle portion 24f and in the vicinity thereof.

Since the atmosphere A inside the second positive pressure generation groove 24 indicated by the white arrow L6 acts to push the sealed fluid F in the vicinity of the terminating end 24B of the second positive pressure generation groove 24 back to the outer space S2 side, the sealed fluid F does not leak to the inner space S1.

Next, a change in a force that separates the sliding surfaces 11 and 21 will be described with reference to FIG. 7. Incidentally, here, forces generated in the first positive pressure generation groove 14 and the second positive pressure generation groove 24 are illustrated, and a force generated in the first positive pressure generation groove 15 is not illustrated.

First, during non-operation of the general industrial machine in which the rotating seal ring 20 is not in rotation, since the stationary seal ring 10 is biased to a rotating seal ring 20 side by the bellows 7, the sliding surfaces 11 and 21 are in the state of contact with each other, and there is almost no leakage of the sealed fluid F between the sliding surfaces 11 and 21 to the inner space S1.

Figures 7A, 7B, 7C:
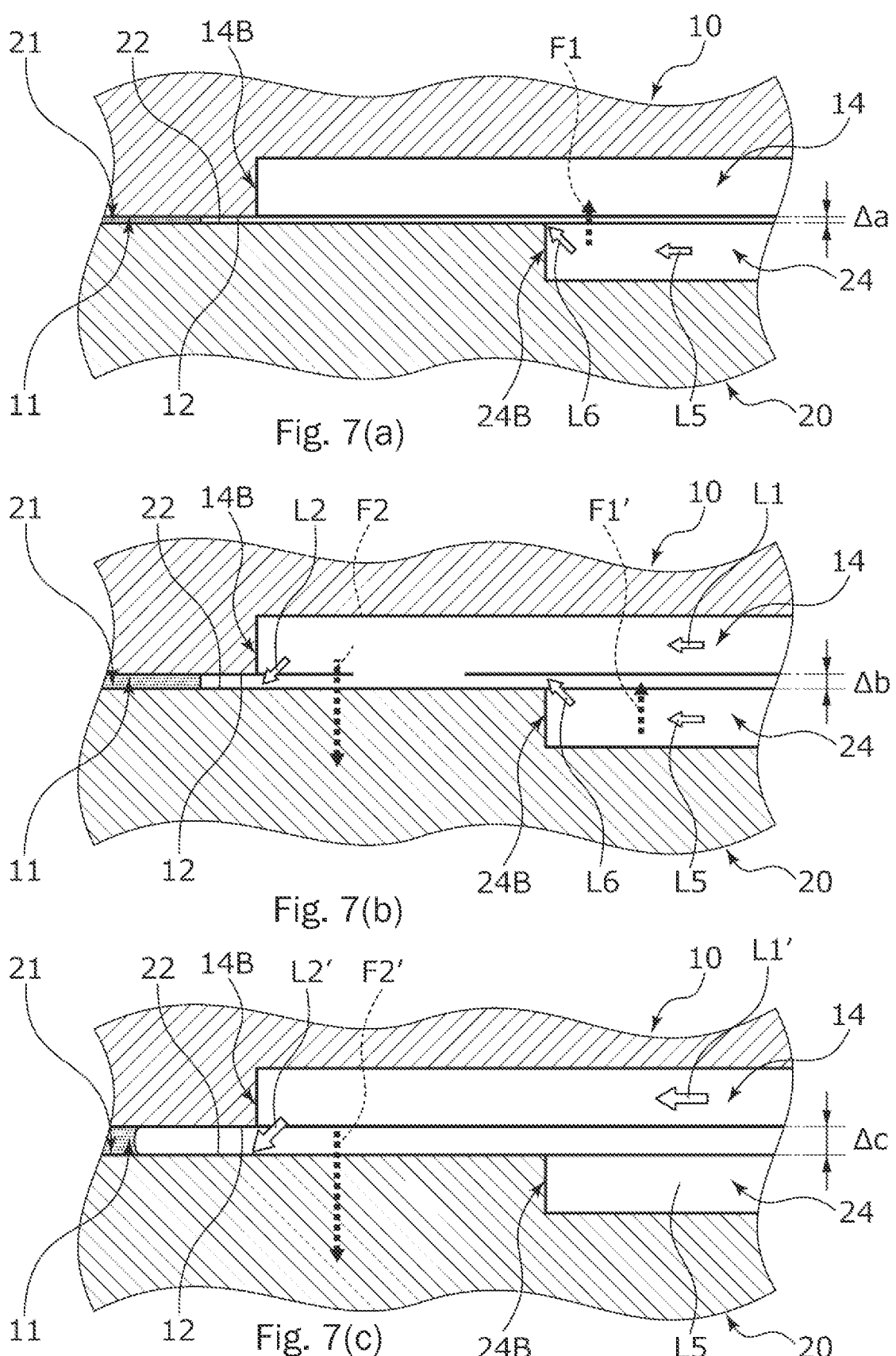
FIGS. 7A to 7C are cross-sectional views schematically illustrating a state of a pair of sliding components for each relative rotation speed in the first embodiment.

At a low speed immediately after the rotating seal ring 20 starts rotating relative to the stationary seal ring 10, as illustrated in FIG. 7A, a positive pressure is generated at the terminating end 24B of the second positive pressure generation groove 24 having a smaller capacity than a capacity of the first positive pressure generation groove 14.

The sliding surfaces 11 and 21 are slightly separated from each other by a distance Δa by a first force F1 caused by the positive pressure generated at the terminating end 24B of the second positive pressure generation groove 24. Accordingly, the sealed fluid F flows from the outer space S2 into the radially outer side of the gap between the sliding surfaces 11 and 21. Since the sealed fluid F is interposed between the sliding surfaces 11 and 21 in such a manner, even during low-speed rotation, lubricity can be improved and wear between the sliding surfaces 11 and 21 can be suppressed. Incidentally, since the floating distance between the sliding surfaces 11 and 21 is slight, the sealed fluid F does not leak to the inner space S1.

On the other hand, since the capacity of the first positive pressure generation groove 14 is larger than the capacity of the second positive pressure generation groove 24, during low-speed relative rotation of the rotating seal ring 20 and the stationary seal ring 10, the atmosphere A is not sufficiently dense in the first positive pressure generation groove 14 so that a high positive pressure is not generated, and a second force F2 (not illustrated in FIG. 7A) caused by the positive pressure generated by the first positive pressure generation groove 14 is relatively smaller than the first force F1. Therefore, during low-speed rotation of the rotating seal ring 20, the first force F1 mainly acts to separate the sliding surfaces 11 and 21 from each other. Incidentally, since a capacity of the first positive pressure generation groove 15 is larger than the capacity of the second positive pressure generation groove 24, during low-speed relative rotation, a force caused by a positive pressure generated by the first positive pressure generation groove 15 is relatively smaller than the first force F1.

When the relative rotation speed of the rotating seal ring 20 increases, as illustrated in FIG. 7B, the positive pressure at the terminating end 14B of the first positive pressure generation groove 14 increases. In addition, at this time, although not illustrated, the positive pressure also increases at the terminating end 15B of the first positive pressure generation groove 15.

The second force F2 that is the sum of the force caused by the positive pressure generated at the terminating end 14B of the first positive pressure generation groove 14 and the force caused by the positive pressure generated at the terminating end 15B of the first positive pressure generation groove 15 is applied, and the sliding surfaces 11 and 21 are further separated from each other by a distance Δb (Δb>Δa) compared to FIG. 7A. Accordingly, the atmosphere A inside the first positive pressure generation groove 14 mainly flows into the gap between the sliding surfaces 11 and 21 as indicated by the white arrow L2.

In addition, since the sliding surfaces 11 and 21 are further separated from each other by the distance Δb (Δb>Δa) compared to FIG. 7A, a first force F1' becomes smaller compared to FIG. 7A.

When the relative rotation speed of the rotating seal ring 20 further increases to high-speed rotation, namely, a steady operating state is reached, as illustrated in FIG. 7C, the inflow amount of the atmosphere A drawn into the first positive pressure generation groove 14 (refer to a white arrow L1' in FIG. 7C) and the inflow amount of the atmosphere A drawn into the first positive pressure generation groove 15 further increase and a high positive pressure is generated, so that a second force F2' increases and the sliding surfaces 11 and 21 are separated from each other by a larger distance Δc (Δc>Δb) compared to FIG. 7B.

Accordingly, a larger amount of the atmosphere A inside the first positive pressure generation groove 14 and a larger amount of the atmosphere A inside the first positive pressure generation groove 15 indicated by a white arrow L2' flow into the gap between the sliding surfaces 11 and 21 compared to FIG. 7B.

The atmosphere A inside the first positive pressure generation groove 14 and the atmosphere A inside the first positive pressure generation groove 15 indicated by the white arrow L2' act to push the sealed fluid F in the vicinity of the terminating end 14B of the first positive pressure generation groove 14 and at the terminating end 15B of the first positive pressure generation groove 15 (refer to FIG. 6A) back to the outer space S2 side. In such a manner, during high-speed rotation, the sealed fluid F between the sliding surfaces 11 and 21 is pushed out to the outer space S2, and substantially only the atmosphere A exists between the sliding surfaces 11 and 21.

In the present embodiment, when the floating distance is increased due to high-speed rotation of the rotating seal ring 20, the positive pressure generated in the second positive pressure generation groove 24 is negligibly small. Therefore, during high-speed rotation of the rotating seal ring 20, the second force F2' mainly acts to separate the sliding surfaces 11 and 21 from each other.

Returning to FIG. 4, a plurality of intersection portions 16 between the first positive pressure generation grooves 14 and the second positive pressure generation grooves 24 and a plurality of intersection portions 16 between the first positive pressure generation grooves 15 and the second positive pressure generation grooves 24 are formed between the sliding surfaces 11 and 21. Accordingly, in addition to the introduction of the atmosphere A from a starting end 24A side to the second positive pressure generation grooves 24, since the atmosphere A is also introduced from the first positive pressure generation grooves 14 into the second positive pressure generation grooves 24 through the intersection portions 16, the first force F1 (refer to FIG. 7) that separates the sliding surfaces 11 and 21 from each other can be generated at an early time.

Next, a change in the intersection position between the first positive pressure generation groove 14 and the second positive pressure generation groove 24 during relative rotation of the stationary seal ring 10 and the rotating seal ring 20 will be described with reference to FIG. 8. Incidentally, here, for convenience of description, a change in the position of the intersection portion 16 between one first positive pressure generation groove 14 and one second positive pressure generation groove 24 will be described, and the intersection portion 16 is illustrated by a halftone screen.

Figures 8A, 8B, 8C:
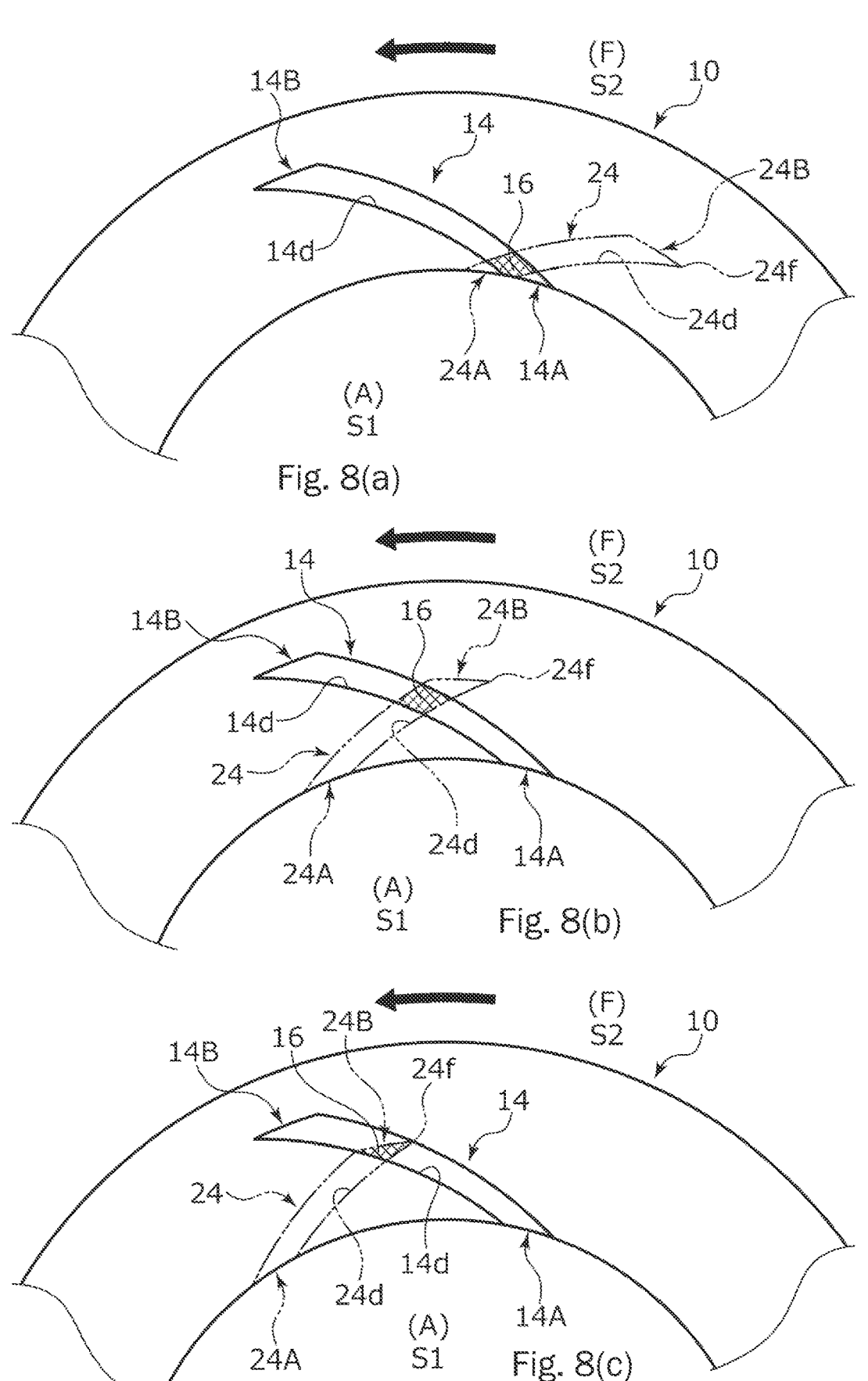
FIG. 8 is an explanatory view illustrating a change in the position of an intersection portion between the first positive pressure generation groove and the second positive pressure generation groove in the first embodiment, where an intersection portion between one first positive pressure generation groove and one second positive pressure generation groove is taken and illustrated.

FIG. 8A illustrates a state where the starting end 14A of the first positive pressure generation groove 14 and the starting end 24A of the second positive pressure generation groove 24 intersect each other when viewed in the axial direction. Namely, the intersection portion 16 between the first positive pressure generation groove 14 and the second positive pressure generation groove 24 is located at the starting end 14A of the first positive pressure generation groove 14.

When the rotating seal ring 20 rotates relative to the stationary seal ring 10, as illustrated in FIG. 8B, the intersection portion 16 moves to a terminating end 14B side of the first positive pressure generation groove 14, and is located at a center portion of the first positive pressure generation groove 14 in the longitudinal direction.

At this time, the fluid inside the first positive pressure generation groove 14 is collected into the intersection portion 16 by the side wall portion 24d of the second positive pressure generation groove 24, and the pressure of the intersection portion 16 becomes higher than that of portions of the first positive pressure generation groove 14 and the second positive pressure generation groove 24 other than the intersection portion 16.

When the rotating seal ring 20 further rotates relative to the stationary seal ring 10, as illustrated in FIG. 8C, the intersection portion 16 further moves toward the terminating end 14B side of the first positive pressure generation groove 14.

At this time, a mass of the fluid collected into the intersection portion 16 receives shear forces from the side wall portion 14d of the first positive pressure generation groove 14 and the acute angle portion 24f of the second positive pressure generation groove 24, and a large positive pressure is generated.

In such a manner, since the mass of the fluid inside the intersection portion 16 is moved from a starting end 14A side and the starting end 24A side to the terminating end 14B side and the terminating end 24B side of the first positive pressure generation groove 14 and the second positive pressure generation groove 24, and a large positive pressure is generated at the terminating end 24B of the second positive pressure generation groove 24, the first force F1 (refer to FIG. 7) that separates the sliding surfaces 11 and 21 from each other can be generated at an early time.

In addition, when the rotating seal ring 20 rotates relative to the stationary seal ring 10, since the fluid inside the first positive pressure generation groove 15 is also taken into the second positive pressure generation groove 24 from the intersection portion 16 between the first positive pressure generation groove 15 and the second positive pressure generation groove 24, a positive pressure can be generated at the second positive pressure generation groove 24 at an early time.

Next, a contamination C that has flowed into the gap between the sliding surfaces 11 and 21 will be described with reference to FIG. 6.

Contamination may be mixed in the sealed fluid F flowing into the gap between the sliding surfaces 11 and 21. The contamination mainly exists on the lands 12 and 22 radially outside the first positive pressure generation groove 14 and the second positive pressure generation groove 24. As indicated by a black arrow C1 in FIG. 6A, the contamination moves in the circumferential direction while following in the relative rotation direction of the rotating seal ring 20, and is collected at a portion of the first positive pressure generation groove 15 disposed radially outside the first positive pressure generation groove 14 and the second positive pressure generation groove 24.

As indicated by a black arrow C2 in FIG. 6A, the contamination collected in the first positive pressure generation groove 15 moves toward the terminating end 15B, together with the atmosphere A flowing through the first positive pressure generation groove 15 as indicated by a white arrow L3. Then, the contamination is discharged from the acute angle portion 15f of the first positive pressure generation groove 15 and the vicinity of the acute angle portion 15f to the radially outer side, and most of the contamination is discharged to the outer space S2 as indicated by a black arrow C3 in FIG. 6A. Accordingly, the stay of the contamination between the sliding surfaces 11 and 21 for a long time is suppressed.

As described above, since the sliding surface 11 of the stationary seal ring 10 and the sliding surface 21 of the rotating seal ring 20 slide against each other in a state where the second positive pressure generation grooves 24 and both the first positive pressure generation grooves 14 and the first positive pressure generation grooves 15 intersect each other, and the intersection portions 16 between the first positive pressure generation grooves 14 and the second positive pressure generation grooves 24 and the intersection portions 16 between the first positive pressure generation grooves 15 and the second positive pressure generation grooves 24 communicate with each other, during low-speed relative rotation, in addition to the starting ends 24A of the second positive pressure generation grooves 24, the fluid can also be taken in from the first positive pressure generation grooves 14 and the first positive pressure generation grooves 15 facing each other, and the first force F1 can be immediately generated.

In addition, since a plurality of the first positive pressure generation grooves 14 face one second positive pressure generation groove 24 in an intersecting manner, and during relative rotation of the stationary seal ring 10 and the rotating seal ring 20, the fluid can be taken into the second positive pressure generation groove 24 from the plurality of first positive pressure generation grooves 14, a positive pressure can be generated in the second positive pressure generation groove 24 at an early time.

In addition, the first positive pressure generation groove 15 can collect the contamination that has flowed into the outer space S2 side from the terminating end 14B of the first positive pressure generation groove 14 and the terminating end 24B of the second positive pressure generation groove 24 between the sliding surfaces 11 and 21, and the first positive pressure generation groove 15 can discharge the contamination from the terminating end 15B to the outer space S2. By changing the length of the first positive pressure generation groove 15, the effect of discharging the contamination can be enhanced.

In addition, the first positive pressure generation groove 15 is a positive pressure generation groove that generates a positive pressure. According to this configuration, the positive pressure generated in the first positive pressure generation groove 15 can discharge the contamination C from the first positive pressure generation groove 15, and can be used as a force that separates the sliding surfaces 11 and 21 from each other.

In addition, the first positive pressure generation groove 15 is provided in the stationary seal ring 10. According to this configuration, during low-speed relative rotation of the stationary seal ring 10 and the rotating seal ring 20, since the fluid is less likely to be introduced into the first positive pressure generation groove 15 on a stationary seal ring 10 side than into the second positive pressure generation groove 24 on the rotating seal ring 20 side, the fluid is less likely to flow through the first positive pressure generation groove 15, so that the generation of a positive pressure in the second positive pressure generation groove 24 is not hindered. In other words, the second positive pressure generation groove 24 can generate a positive pressure during low-speed relative rotation of the stationary seal ring 10 and the rotating seal ring 20.

In addition, the volume of the first positive pressure generation groove 14 is larger than the volume of the second positive pressure generation groove 24. According to this configuration, during low-speed relative rotation of the stationary seal ring 10 and the rotating seal ring 20, the first force F1 caused by the positive pressure generated inside the second positive pressure generation groove 24 by the atmosphere A mainly acts to separate the sliding surfaces 11 and 21 from each other. Further, as the relative rotation speed between the stationary seal ring 10 and the rotating seal ring 20 increases, the second force F2 caused by the positive pressure generated inside the first positive pressure generation groove 14 by the atmosphere A increases, and when the relative rotation speed between the stationary seal ring 10 and the rotating seal ring 20 becomes sufficiently high, the second force F2 becomes larger than the first force F1, so that the second force F2 mainly acts to separate the sliding surfaces 11 and 21 from each other. Accordingly, wear between the sliding surfaces 11 and 21 from low-speed relative rotation to high speed of the stationary seal ring 10 and the rotating seal ring 20 can be suppressed.

In addition, the volume of the first positive pressure generation groove 15 is larger than the volume of the first positive pressure generation groove 14. According to this configuration, during high-speed relative rotation of the stationary seal ring 10 and the rotating seal ring 20, since a larger positive pressure can be generated than in the first positive pressure generation groove 14 and the second positive pressure generation groove 24, the contamination C is easily discharged to the outer space S2.

Further, since the number of the first positive pressure generation grooves 15 is smaller than the number of the first positive pressure generation grooves 14, the separation of the sliding surfaces 11 and 21 mainly by the second force F2' is not hindered.

In addition, since the first positive pressure generation grooves 15 are evenly arranged in the circumferential direction, a positive pressure is generated in the first positive pressure generation grooves 15 in a well-balanced manner in the circumferential direction of the sliding surfaces 11 and 21, and the separation of the sliding surfaces 11 and 21 is not hindered.

In addition, the second positive pressure generation groove 24 having a smaller capacity than the first positive pressure generation groove 14 is provided in the rotating seal ring 20. According to this configuration, since the fluid is easily introduced into the second positive pressure generation groove 24 by the rotational force of the rotating seal ring 20, during low-speed relative rotation of the stationary seal ring 10 and the rotating seal ring 20, a positive pressure can be immediately generated in the second positive pressure generation groove 24 having a smaller volume by the rotation of the rotating seal ring 20.

In addition, the first positive pressure generation grooves 14, the first positive pressure generation grooves 15, and the second positive pressure generation grooves 24 are inclined and extend from the inner space S1 side toward the radially outer side in the circumferential direction. According to this configuration, since a large number of the first positive pressure generation grooves 14, the first positive pressure generation grooves 15, and the second positive pressure generation grooves 24 can be disposed on the respective sliding surfaces 11 and 21 of the stationary seal ring 10 and the rotating seal ring 20, the degree of freedom in design is high.

In addition, since the terminating end 14B of the first positive pressure generation groove 14 is located radially outside the terminating ends 24B of the second positive pressure generation groove 24, a positive pressure generated at the terminating end 14B and a positive pressure generated at the terminating end 24B do not interfere with each other.

Second Embodiment

Next, a pair of sliding components according to a second embodiment of the present invention will be described with reference to FIG. 9. Incidentally, the descriptions of configurations that are the same as and overlap with the configurations of the first embodiment will be omitted.

Figure 9:
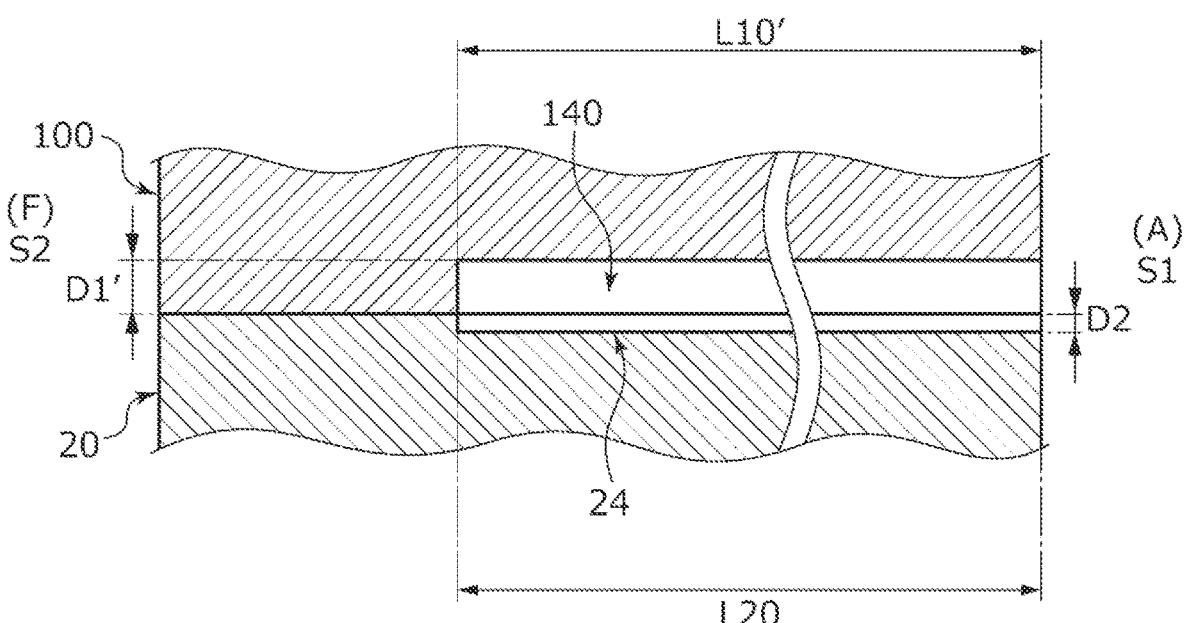
FIG. 9 is a cross-sectional view schematically illustrating each of the other grooves of first positive pressure generation grooves and each of a second positive pressure generation grooves included in a mechanical seal as sliding components according to a second embodiment of the present invention.

As illustrated in FIG. 9, an extension distance L10' of a first positive pressure generation groove 140 of a stationary seal ring 100 is the same length as the extension distance L20 of the second positive pressure generation groove 24. Incidentally, although not illustrated, the extension distance L10' of the first positive pressure generation groove 140 is shorter than the extension distance L11 of the first positive pressure generation groove 15.

In addition, a depth D1' of the first positive pressure generation groove 140 is deeper than the depth D2 of the second positive pressure generation groove 24. Namely, a volume of the first positive pressure generation groove 140 is larger than the volume of the second positive pressure generation groove 24. Incidentally, although not illustrated, the depth of the first positive pressure generation groove 15 is the same as the depth D1' of the first positive pressure generation groove 140. Namely, the volume of the first positive pressure generation groove 15 is larger than the volumes of the first positive pressure generation groove 140 and the second positive pressure generation groove 24.

Third Embodiment

Next, a pair of sliding components according to a third embodiment of the present invention will be described with reference to FIG. 10. Incidentally, the descriptions of configurations that are the same as and overlap with the configurations of the first embodiment will be omitted.

Figure 10:
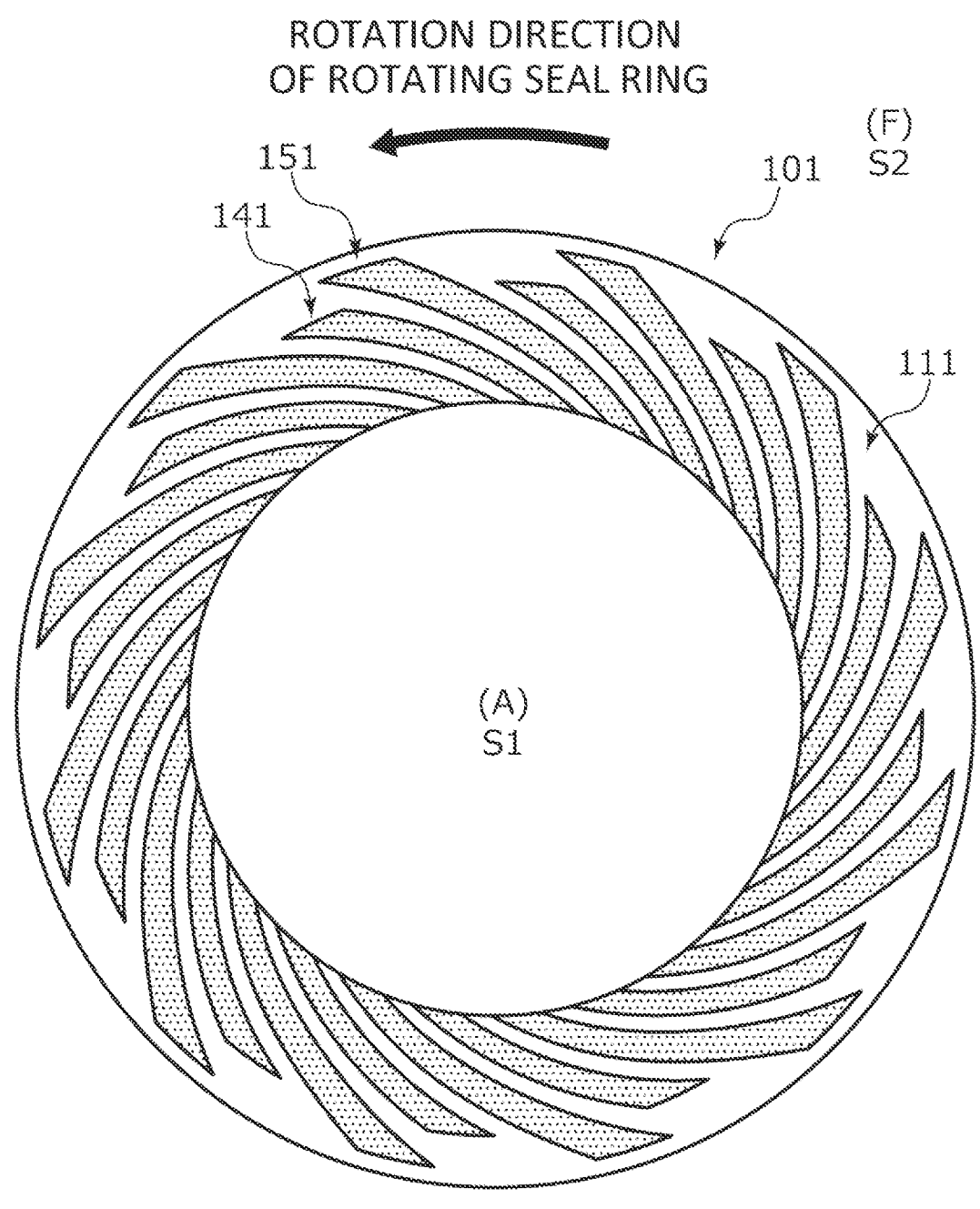
FIG. 10 is a view of a sliding surface of a stationary seal ring of a mechanical seal as sliding components according to a third embodiment of the present invention when viewed in the axial direction.

As illustrated in FIG. 10, first positive pressure generation grooves 141 and first positive pressure generation grooves 151 are alternately arranged in the circumferential direction on a sliding surface 111 of a stationary seal ring 101.

According to this configuration, on the sliding surface 111, contamination existing on the radially outer side of one first positive pressure generation groove 141 is discharged to the outer space S2 by the first positive pressure generation groove 151 adjacent thereto on a downstream side in the relative rotation direction of the rotating seal ring 20.

Fourth Embodiment

Next, a pair of sliding components according to a fourth embodiment of the present invention will be described with reference to FIG. 11. Incidentally, the descriptions of configurations that are the same as and overlap with the configurations of the first embodiment will be omitted.

Figure 11:
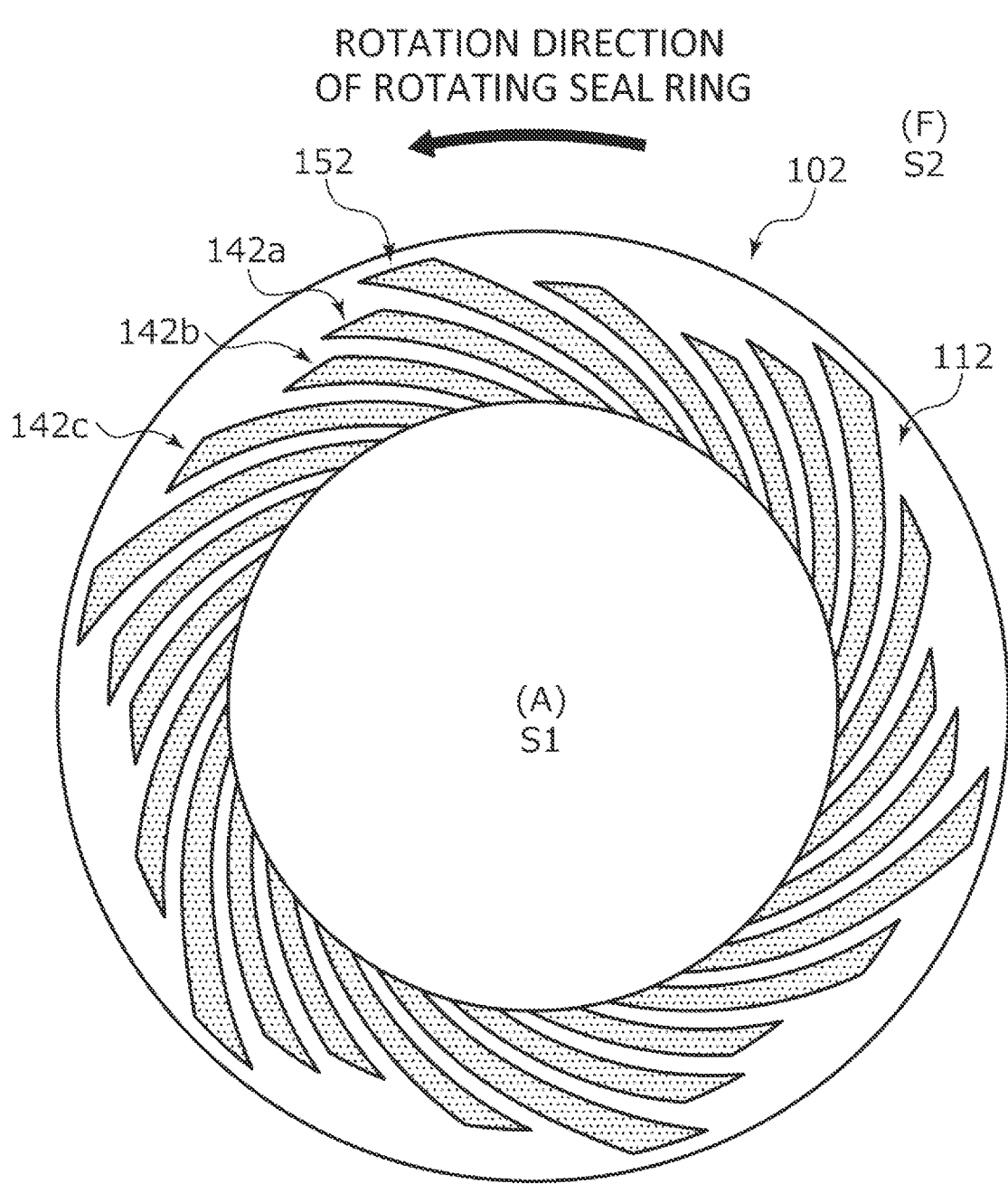
FIG. 11 is a view of a sliding surface of a stationary seal ring of a mechanical seal as sliding components according to a fourth embodiment of the present invention when viewed in the axial direction.

As illustrated in FIG. 11, first positive pressure generation grooves 152 (six in the present embodiment) are evenly arranged in the circumferential direction on a sliding surface 112 of a stationary seal ring 102. In addition, first positive pressure generation grooves 142a, 142b, and 142c are disposed between the first positive pressure generation grooves 152 adjacent to each other in the circumferential direction.

The first positive pressure generation groove 142a is disposed upstream of the first positive pressure generation grooves 142b and 142c in the relative rotation direction of the rotating seal ring 20, the first positive pressure generation groove 142c is disposed downstream of the first positive pressure generation grooves 142a and 142b in the relative rotation direction of the rotating seal ring 20, and the first positive pressure generation groove 142b is disposed between the first positive pressure generation grooves 142a and 142c.

The first positive pressure generation grooves 142a, 142b, and 142c are shorter than the first positive pressure generation groove 152. In addition, the first positive pressure generation grooves 142a and 142c have the same length. In addition, the first positive pressure generation groove 142b is shorter than the first positive pressure generation grooves 142a and 142c.

Contamination existing on the radially outer side of the first positive pressure generation groove 142b is collected in the first positive pressure generation groove 142c, then is discharged toward the first positive pressure generation groove 152 on the downstream side of the relative rotation, and is discharged from the first positive pressure generation groove 152 to the outer space S2. In such a manner, contamination on the radially inner side of the sliding surface 112, namely, at a position away from the outer space S2 is discharged to the outer space S2 through the first positive pressure generation groove 142a and the first positive pressure generation groove 152.

In addition, the first positive pressure generation groove 142a having the same length as the first positive pressure generation groove 142c is provided on an upstream side of the relative rotation of the first positive pressure generation groove 142b. According to this configuration, since terminating end portions of the first positive pressure generation grooves 142a, 142b, and 142c and terminating end portions of the first positive pressure generation grooves 152 are disposed in a well-balanced manner in the circumferential direction and radial direction of the sliding surface 112, the sliding surfaces can be separated from each other in a well-balanced manner.

Incidentally, in the fourth embodiment, as first positive pressure generation grooves provided in the stationary seal ring 102, the first positive pressure generation grooves 142a, 142b, and 142c and the first positive pressure generation grooves 152 having different lengths are provided. In such a case, the first positive pressure generation grooves 152 having the longest extension distance function as one grooves, and the other first positive pressure generation grooves 142a, 142b, and 142c shorter than the first positive pressure generation grooves 152 function as the other grooves.

Fifth Embodiment

Next, a pair of sliding components according to a fifth embodiment of the present invention will be described with reference to FIG. 12. Incidentally, the descriptions of configurations that are the same as and overlap with the configurations of the first embodiment will be omitted.

Figure 12:
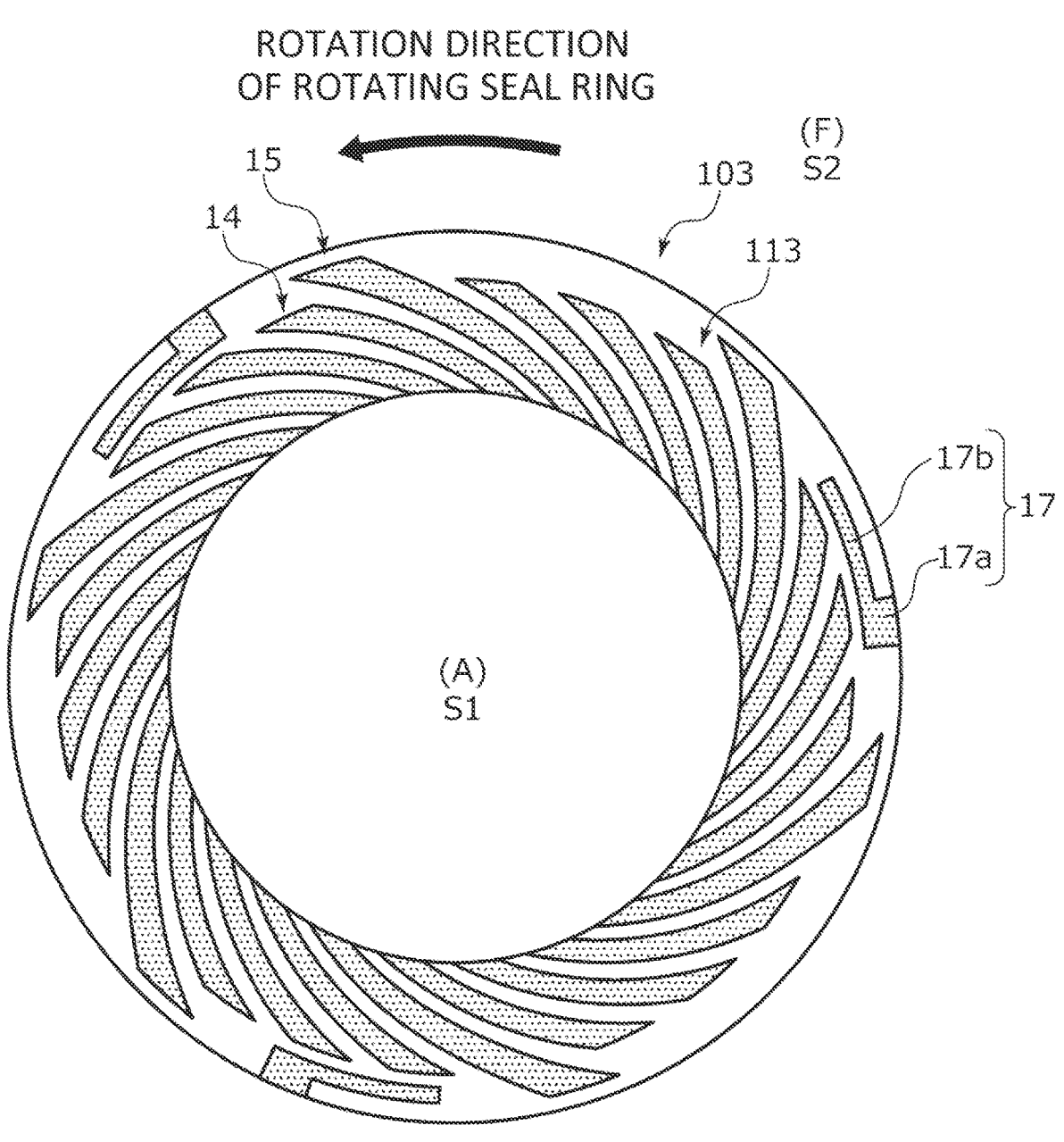
FIG. 12 is a view of a sliding surface of a stationary seal ring of a mechanical seal as sliding components according to a fifth embodiment of the present invention when viewed in the axial direction.

As illustrated in FIG. 12, in addition to the first positive pressure generation grooves 14 and the first positive pressure generation grooves 15, a plurality (three in the present embodiment) of dynamic pressure generation mechanisms 17 are provided on a sliding surface 113 of a stationary seal ring 103.

Each of the dynamic pressure generation mechanisms 17 includes a fluid inlet groove 17a and a Rayleigh step 17b. The fluid inlet groove 17a extends in the radial direction so as to communicate with the outer space S2 and not to communicate with the inner space S1. The Rayleigh step 17b extends concentrically with the stationary seal ring 103 in the circumferential direction and in a counterclockwise direction on the drawing sheet of FIG. 12 from the radially inner side of the fluid inlet groove 17a, namely, in the relative rotation direction of the rotating seal ring 20.

According to this configuration, in addition to realizing low friction between the sliding surfaces using the atmosphere A through the first positive pressure generation grooves 14, the first positive pressure generation grooves 15, and the second positive pressure generation grooves 24, liquid lubrication using the sealed fluid F through the dynamic pressure generation mechanisms 17 can be performed.

Figure 13:
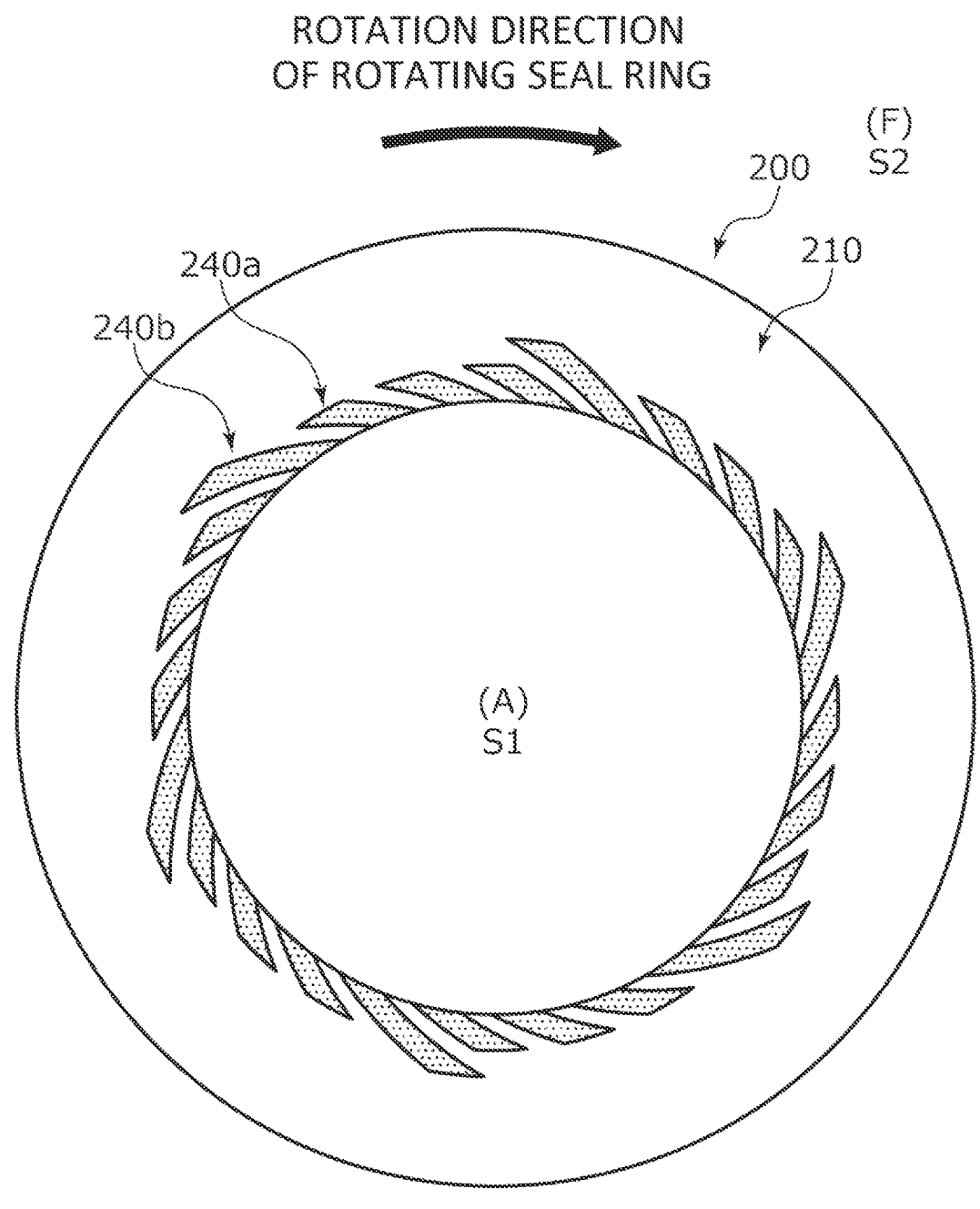
FIG. 13 is a view of a sliding surface of a rotating seal ring of a first modification example in the first to fifth embodiments when viewed in the axial direction.

Incidentally, in the first to fifth embodiments, a mode in which the second positive pressure generation grooves having the same length are provided on the sliding surface of the rotating seal ring has been provided as an example; however, for example, as illustrated in FIG. 13, second positive pressure generation grooves 240a and 240b having different lengths may be provided on a sliding surface of a rotating seal ring 200.

Figure 14:
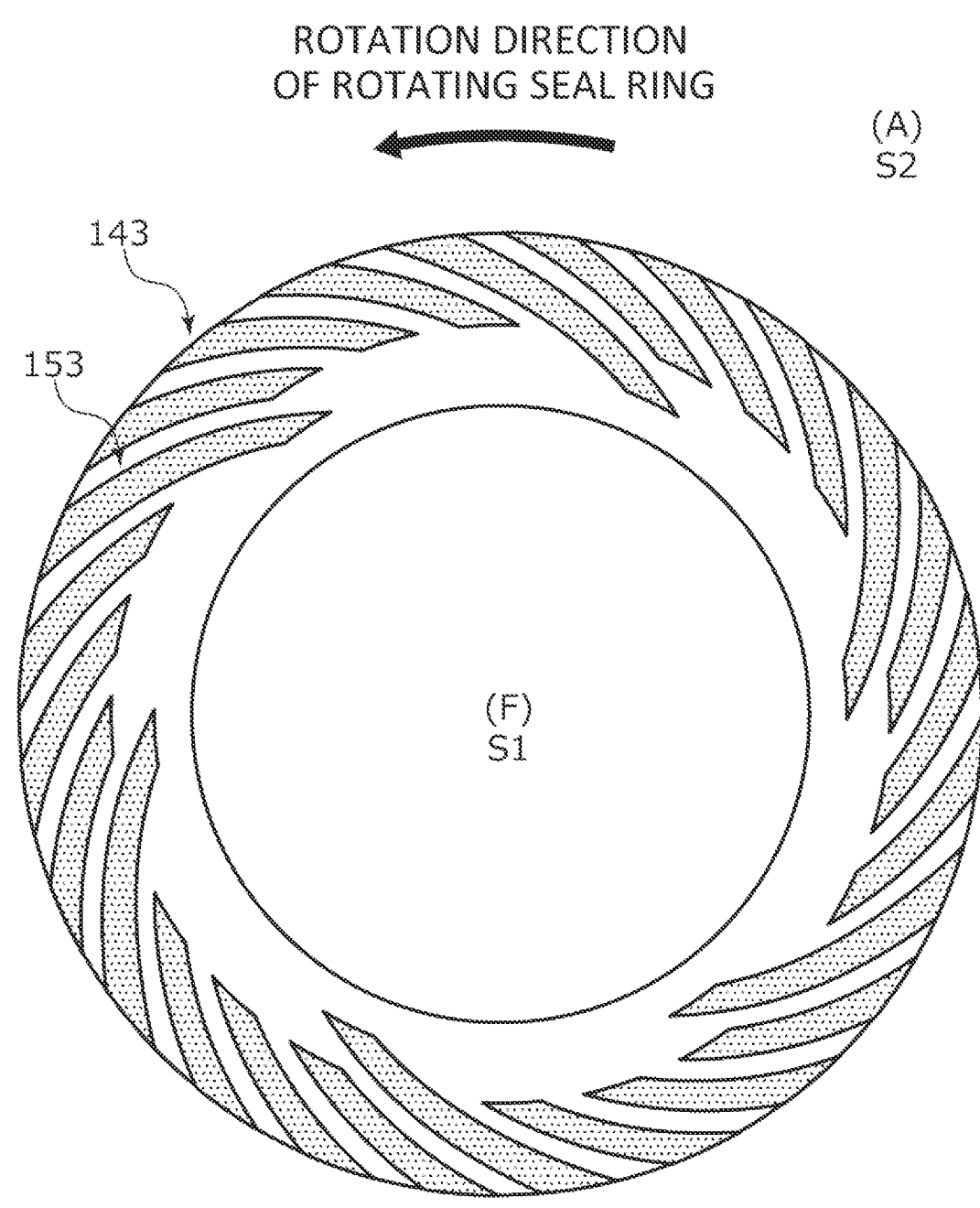
FIG. 14 is a view of a sliding surface of a stationary seal ring of a second modification example in the first to fifth embodiments when viewed in the axial direction.

In addition, in the first to fifth embodiments, the leakage side and the sealed fluid side have been described as the inner space and the outer space, respectively; however, for example, as illustrated in FIG. 14, the sealed fluid F may be sealed in the inner space S1, and the atmosphere A exists in the outer space S2. In this case, first positive pressure generation grooves 143 and first positive pressure generation grooves 153 may communicate with the outer space S2, and may not communicate with the inner space S1. Further, although not illustrated, the second positive pressure generation grooves may communicate with the outer space S2, and may not communicate with the inner space S1.

Figure 15:
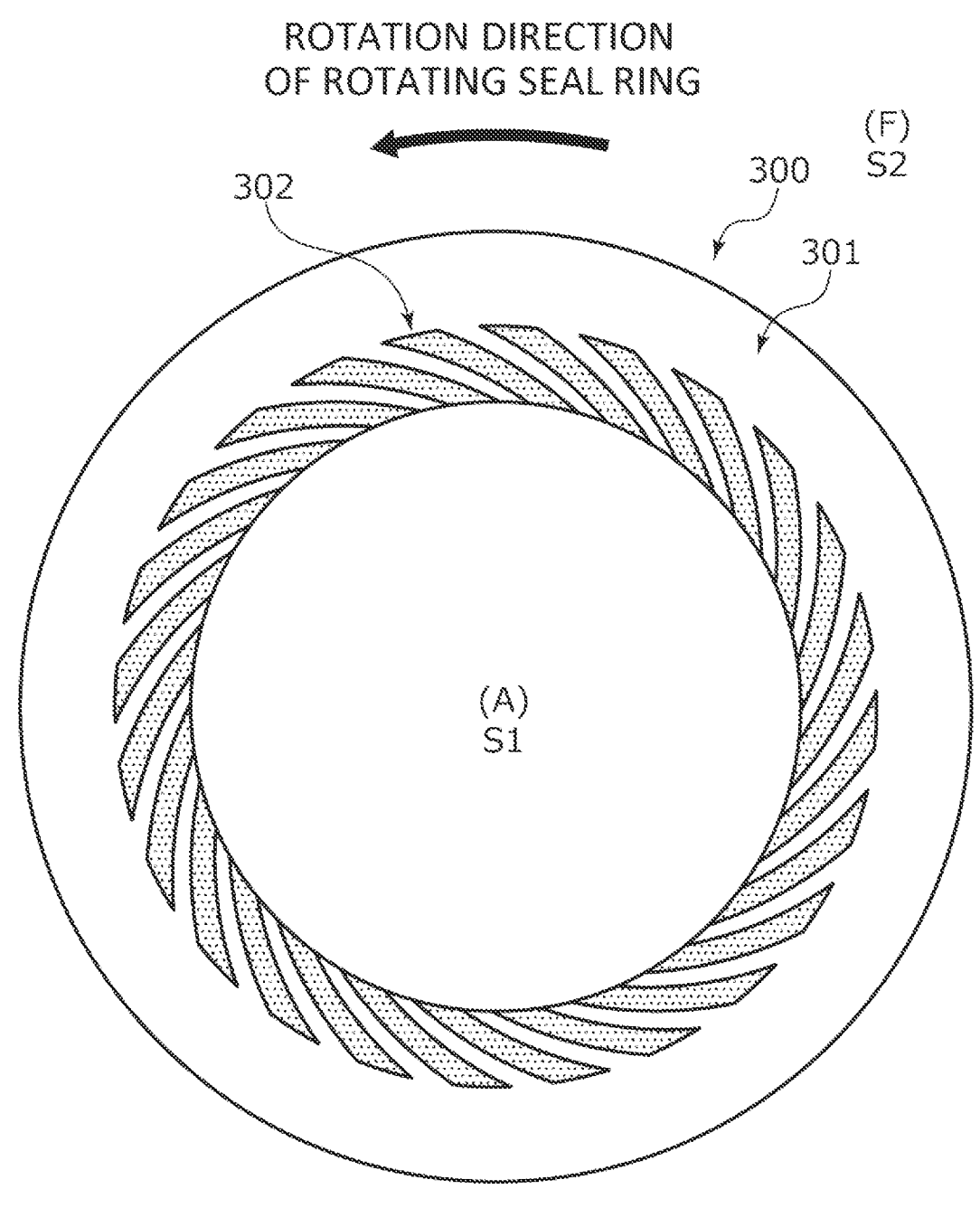
FIG. 15 is a view of a sliding surface of a stationary seal ring of a third modification example in the first to fifth embodiments when viewed in the axial direction.
Figure 16:
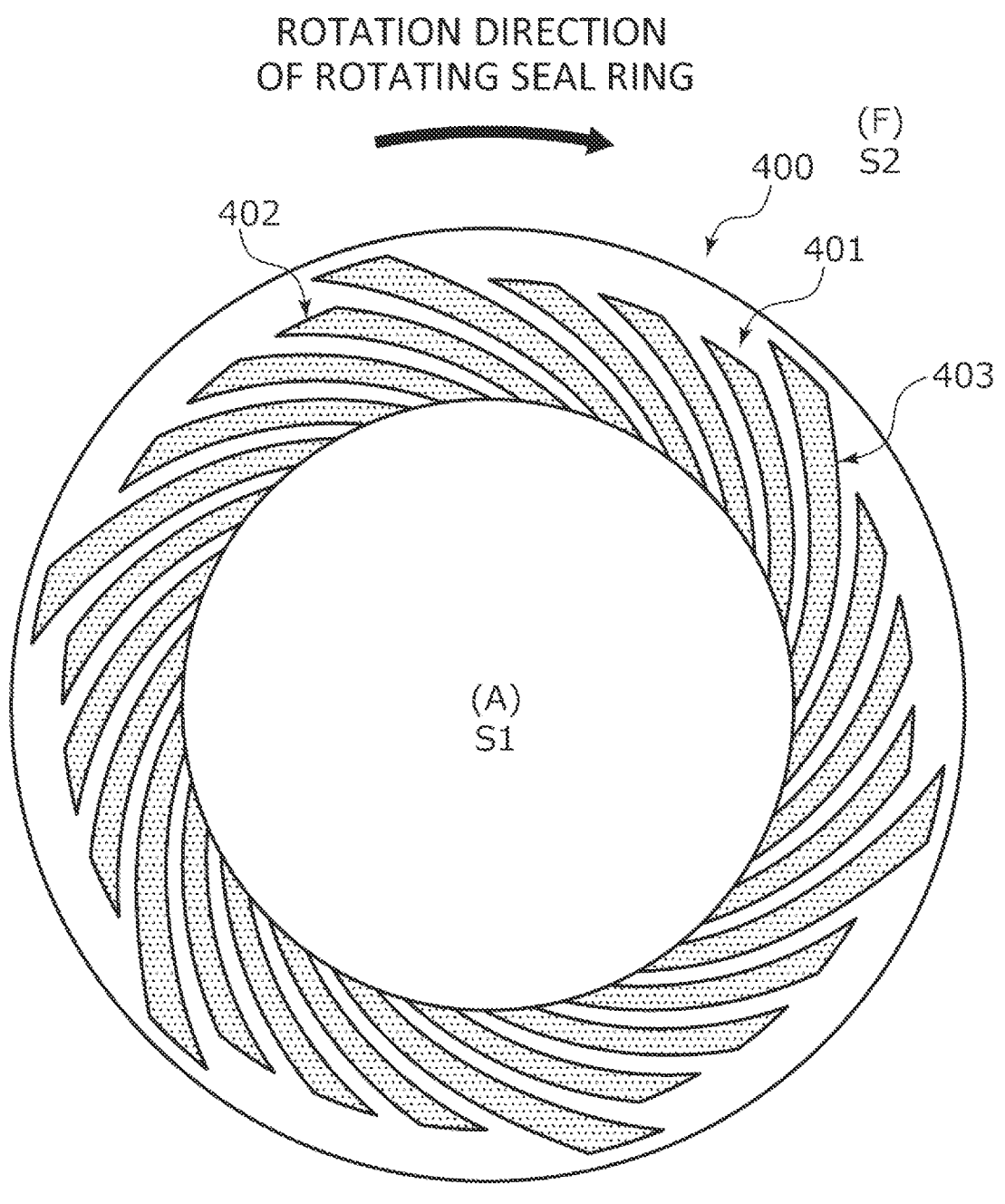
FIG. 16 is a view of a sliding surface of a rotating seal ring of the third modification example in the first to fifth embodiments when viewed in the axial direction.

In addition, in the first to fifth embodiments, a mode in which the stationary seal ring is the first sliding component and the rotating seal ring is the second sliding component has been provided as an example; however, for example, as illustrated in FIGS. 15 and 16, a stationary seal ring 300 may be the second sliding component, and a rotating seal ring 400 may be the first sliding component.

Specifically, as illustrated in FIG. 15, a plurality of second positive pressure generation grooves 302 having the same length are formed in the circumferential direction on a sliding surface 301 of the stationary seal ring 300. In addition, as illustrated in FIG. 16, a plurality of first positive pressure generation grooves 402 as the other grooves and a plurality of first positive pressure generation grooves 403 as one grooves are provided on a sliding surface 401 of the rotating seal ring 400.

In such a manner, since the first positive pressure generation grooves 403 are provided in the rotating seal ring 400, a positive pressure is likely to be generated in the first positive pressure generation grooves 403 using the rotational force of the rotating seal ring 400, and contamination is easily discharged.

The embodiments of the present invention have been described above with reference to the drawings; however, the specific configurations are not limited to the embodiments, and modifications or additions that are made without departing from the scope of the present invention are included in the present invention.

For example, in the first to fifth embodiments, as examples of the sliding components, the mechanical seals for general industrial machines have been described; however, the sliding components may form another mechanical seal for an automobile, a water pump, or the like. In addition, the present invention is not limited to the mechanical seal, and may be applied to a sliding component such as a slide bearing other than the mechanical seal.

In addition, in the first to fifth embodiments, a mode in which the other groove is equal to or longer than the second positive pressure generation groove has been provided as an example; however, the present invention is not limited thereto, and the other groove may be shorter than the second positive pressure generation groove as longer as one groove is longer than the second positive pressure generation groove.

In addition, in the first to fifth embodiments, a mode in which a positive pressure generated in one groove of the first positive pressure generation grooves is larger than positive pressures generated in the other groove of the first positive pressure generation grooves and the second positive pressure generation groove has been provided as an example; however, the positive pressure generated in the one groove may be smaller than the positive pressures generated in the other groove and the second positive pressure generation groove. In this case, the other groove may mainly act to separate the sliding surfaces from each other.

In addition, in the first to fifth embodiments, a mode in which the first positive pressure generation groove and the second positive pressure generation groove have substantially the same degree of inclination in the circumferential direction when viewed from each sliding surface has been provided as an example; however, the first positive pressure generation groove and the second positive pressure generation groove may have different degrees of inclination in the circumferential direction.

In addition, in the first to fifth embodiments, a mode in which a plurality of the first positive pressure generation grooves face one second positive pressure generation groove in an intersecting manner has been provided as an example; however, one first positive pressure generation groove may face one second positive pressure generation groove in an intersecting manner.

In addition, in the first to fifth embodiments, a mode in which the volume of the other groove of the first positive pressure generation grooves is larger than the volume of the second positive pressure generation groove has been provided as an example; however, the volume of the other groove of the first positive pressure generation grooves may be smaller than the volume of the second positive pressure generation groove, or the volume of the other groove of the first positive pressure generation grooves and the volume of the second positive pressure generation groove may be the same.

In addition, in the first embodiment, a mode in which the length of the first positive pressure generation groove is formed longer than the length of the second positive pressure generation groove has been provided as an example, and in the second embodiment, a mode in which by forming the depth of the first positive pressure generation groove to be deeper than the depth of the second positive pressure generation groove, the capacity of the first positive pressure generation groove is made larger than the capacity of the second positive pressure generation groove has been provided as an example; however, by forming the width of the first positive pressure generation groove to be larger than the width of the second positive pressure generation groove, the volume of the first positive pressure generation groove may be made larger than the volume of the second positive pressure generation groove.

In addition, in the first to fifth embodiments, a mode in which one groove and the other groove of the first positive pressure generation grooves and the second positive pressure generation groove are inclined and extend from the leakage side toward the sealed fluid side in the circumferential direction has been provided as an example; however, the present invention is not limited thereto, and for example, the one groove or the other groove of the first positive pressure generation grooves or the second positive pressure generation groove may be formed only with a component extending in the circumferential direction. Namely, one of the one groove and the other groove of the first positive pressure generation groove and the second positive pressure generation groove may include a component extending in the radial direction and a component extending in the circumferential direction, and the one groove and the other groove of the first positive pressure generation grooves and the second positive pressure generation groove may face each other so as to at least partially intersect each other.

In addition, in the first to fifth embodiments, a mode in which one grooves are evenly arranged in the circumferential direction has been provided as an example; however, the one grooves may not be evenly arranged. In addition, at least single one groove may be provided.

In addition, in the first to fifth embodiments, a mode in which the number of grooves each of which corresponds to one groove is smaller than the number of the other grooves has been provided as an example; however, the number of grooves each of which corresponds to the one groove may be the same as the number of the other grooves or may be larger than the number of the other grooves.

In addition, in the first to fifth embodiments, a mode in which the cross-sectional shapes of one groove and the other groove of the first positive pressure generation grooves and of the second positive pressure generation groove are constant in the longitudinal direction has been provided as an example; however, for example, steps or inclined surfaces may be formed on the bottom surfaces of the one groove and the other groove of the first positive pressure generation grooves and of the second positive pressure generation groove.

In addition, the sealed fluid side and the leakage side have been described as a high-pressure side and a low-pressure side, respectively; however, the sealed fluid side and the leakage side may be a low-pressure side and a high-pressure side, respectively, or the sealed fluid side and the leakage side may have substantially the same pressure.

In addition, in the first to fifth embodiments, the sealed fluid F has been described as a high-pressure liquid, but is not limited thereto, and may be a gas or a low-pressure liquid or may be in the form of a mist that is a mixture of liquid and gas.

In addition, in the first to fifth embodiments, the fluid on the leakage side has been described as the atmosphere A that is a low-pressure gas, but is not limited thereto, and may be a liquid or a high-pressure gas or may be in the form of a mist that is a mixture of liquid and gas.

REFERENCE SIGNS LIST

10 Stationary seal ring (first sliding component)
11 Sliding surface
12 Land
14 First positive pressure generation groove (other groove)
14B Relative rotation terminating end (terminating end portion)
15 First positive pressure generation groove (one groove)
15B Relative rotation terminating end (terminating end portion)
16 Intersection portion
17 Dynamic pressure generation mechanism
20 Rotating seal ring (second sliding component)
21 Sliding surface
22 Land
24 Second positive pressure generation groove
24B Relative rotation terminating end (terminating end portion)
A Atmosphere
C Contamination
D1 to D3 Depth
F Sealed fluid
F1 First force
F2 Second force
S1 Inner space (space on leakage side)
S2 Outer space (sealed fluid space)

The invention claimed is:

1. Sliding components which are a first sliding component and a second sliding component disposed at a relative rotational location of a rotating machine, and of which sliding surfaces are directly brought into contact with and slide relative to each other, wherein the sliding surface of the first sliding component is provided with a plurality of first positive pressure generation grooves having an opening portion which is opened to a space on a leakage side, extending in a relative rotation direction of the second sliding component with an inclination toward a radial direction, and including terminating end portions on a sealed fluid side, the sliding surface of the second sliding component is provided with a plurality of second positive pressure generation grooves communicating with the space on the leakage side, extending in a relative rotation direction of the first sliding component with the inclination toward the radial direction, and including terminating end portions on the sealed fluid side, the sliding surface of the first sliding component and the sliding surface of the second sliding component slide against each other in an intersecting manner such that the first positive pressure generation grooves and the second positive pressure generation grooves at least partially overlap each other, at least one groove of the first positive pressure generation grooves differs in a radial position of the terminating end portion from other grooves of the first positive pressure generation grooves, the terminating end portion of the one groove is located closer to a sealed fluid space side than the terminating end portions of the other grooves and the terminating end portions of the second positive pressure generation grooves, at least one of the first positive pressure generation grooves is larger, in a radial length, than others of the first positive pressure generation groove and the second pressure generation grooves, the plurality of the second positive pressure generation grooves are smaller, in the radial length, than the first positive pressure generation grooves, the terminal end portion of the at least one of the first positive pressure generation grooves is disposed on the sealed fluid side with respect to the terminal end portions of the others of the first positive generation grooves, the terminal end portions of the second positive generation grooves, and the terminal end portion of at least one of the second positive pressure generation grooves is disposed on the leakage side with respect to the terminal end portions of the first positive pressure generation grooves.

2. The Sliding components according to claim 1, wherein the first sliding component is a rotating seal ring.

3. The Sliding components according to claim 1, wherein a volume of each of the other grooves is larger than a volume of each of the second positive pressure generation grooves, and a volume of the one groove is larger than the volume of each of the other grooves.

4. The Sliding components according to claim 1, wherein the first positive pressure generation grooves include at least two grooves each of which is the one groove and which are evenly arranged in a circumferential direction.

5. The Sliding components according to claim 2, wherein a volume of each of the other grooves is larger than a volume of each of the second positive pressure generation grooves, and a volume of the one groove is larger than the volume of each of the other grooves.

* * * * *